(12) United States Patent
Schairer et al.

(10) Patent No.: US 11,538,477 B2
(45) Date of Patent: Dec. 27, 2022

(54) GENERATING IOT-BASED NOTIFICATION(S) AND PROVISIONING OF COMMAND(S) TO CAUSE AUTOMATIC RENDERING OF THE IOT-BASED NOTIFICATION(S) BY AUTOMATED ASSISTANT CLIENT(S) OF CLIENT DEVICE(S)

(71) Applicant: Google LLC, Mountain View, CA (US)

(72) Inventors: David Roy Schairer, San Jose, CA (US); Sumer Mohammed, New York, NY (US); Mark Spates, IV, San Francisco, CA (US); Prem Kumar, Saratoga, CA (US); Chi Yeung Jonathan Ng, San Francisco, CA (US); Di Zhu, Sunnyvale, CA (US); Steven Clark, San Leandro, CA (US)

(73) Assignee: GOOGLE LLC, Mountain View, CA (US)

( * ) Notice: Subject to any disclaimer, the term of this patent is extended or adjusted under 35 U.S.C. 154(b) by 5 days.

(21) Appl. No.: 17/110,732

(22) Filed: Dec. 3, 2020

(65) Prior Publication Data

US 2021/0090566 A1   Mar. 25, 2021

Related U.S. Application Data

(63) Continuation of application No. 16/609,015, filed as application No. PCT/US2019/022055 on Mar. 13, 2019, now Pat. No. 10,885,917.
(Continued)

(51) Int. Cl.
*G10L 15/22* (2006.01)
*H04W 4/70* (2018.01)
(Continued)

(52) U.S. Cl.
CPC .............. *G10L 15/22* (2013.01); *G06F 3/167* (2013.01); *G10L 15/08* (2013.01); *G10L 15/30* (2013.01);
(Continued)

(58) Field of Classification Search
CPC .... G06F 3/167; G10L 15/22; G10L 2015/223
See application file for complete search history.

(56) References Cited

U.S. PATENT DOCUMENTS

| 8,842,180 B1 | 9/2014 | Kasmir et al. |
| 10,051,600 B1 * | 8/2018 | Zhong ..................... H04L 67/12 |

(Continued)

FOREIGN PATENT DOCUMENTS

| JP | 2017511028 | 4/2017 |
| KR | 20160086364 | 7/2016 |
| WO | 2017205657 | 11/2017 |

OTHER PUBLICATIONS

Australian Patent Office; Examination Report issue in Application No. 2021200128; 5 pages; dated Jan. 11, 2022.
(Continued)

*Primary Examiner* — Samuel G Neway
(74) *Attorney, Agent, or Firm* — Middleton Reutlinger

(57) ABSTRACT

Remote automated assistant component(s) generate client device notification(s) based on a received IoT state change notification that indicates a change in at least one state associated with at least one IoT device. The generated client device notification(s) can each indicate the change in state associated with the at least one IoT device, and can optionally indicate the at least one IoT device. Further, the remote automated assistant component(s) can identify candidate assistant client devices that are associated with the at least one IoT device, and determine whether each of the one or more of the candidate assistant client device(s) should
(Continued)

render a corresponding client device notification. The remote automated assistant component(s) can then transmit a corresponding command to each of the assistant client device(s) it determines should render a corresponding client device notification, where each transmitted command causes the corresponding assistant client device to render the corresponding client device notification.

13 Claims, 12 Drawing Sheets

Related U.S. Application Data

(60) Provisional application No. 62/643,065, filed on Mar. 14, 2018.

(51) Int. Cl.
| | |
|---|---|
| *G16Y 40/10* | (2020.01) |
| *G16Y 40/35* | (2020.01) |
| *G10L 15/08* | (2006.01) |
| *G10L 15/30* | (2013.01) |
| *H04L 12/28* | (2006.01) |
| *G06F 3/16* | (2006.01) |

(52) U.S. Cl.
CPC ............ *G16Y 40/10* (2020.01); *G16Y 40/35* (2020.01); *H04L 12/282* (2013.01); *H04W 4/70* (2018.02); *G10L 2015/088* (2013.01); *G10L 2015/223* (2013.01)

(56) References Cited

U.S. PATENT DOCUMENTS

| | | | |
|---|---|---|---|
| 10,425,780 B1* | 9/2019 | Devaraj | G10L 15/22 |
| 10,885,917 B2* | 1/2021 | Schairer | G10L 15/00 |
| 11,115,630 B1* | 9/2021 | Lemberger | G06V 20/52 |
| 2013/0143519 A1* | 6/2013 | Doezema | A61B 5/681 |
| | | | 455/404.2 |
| 2014/0229185 A1 | 8/2014 | Byrne et al. | |
| 2014/0241354 A1 | 8/2014 | Shuman et al. | |
| 2015/0006296 A1 | 1/2015 | Gupta et al. | |
| 2015/0022620 A1 | 1/2015 | Siminoff | |
| 2015/0134761 A1* | 5/2015 | Sharma | H04W 4/021 |
| | | | 709/204 |
| 2015/0161882 A1 | 6/2015 | Lett | |
| 2016/0007138 A1 | 1/2016 | Palanisamy et al. | |
| 2017/0342741 A1 | 11/2017 | Holland et al. | |
| 2018/0039478 A1 | 2/2018 | Sung et al. | |
| 2018/0191788 A1* | 7/2018 | Lewis | G06F 9/505 |
| 2018/0233147 A1* | 8/2018 | Tukka | G10L 15/22 |
| 2019/0028996 A1* | 1/2019 | Achamola | H04M 1/72448 |
| 2020/0092687 A1* | 3/2020 | Devaraj | H04W 8/22 |
| 2020/0175976 A1* | 6/2020 | Rakshit | H04L 67/125 |
| 2021/0090566 A1* | 3/2021 | Schairer | G06F 3/167 |

OTHER PUBLICATIONS

Australian Patent Office; Notice of Acceptance issue in Application No. 2021200128; 3 pages; dated Jan. 19, 2022.

Japanese Patent Office; Office Action issued in Application No. 2020-548705; 4 pages; dated Apr. 19, 2021.

European Patent Office; Communication issued in Application No. 20188384.0; 8 pages; dated Oct. 12, 2020.

Japanese Patent Office; Notice of Allowance issued in Application No. 2020-548705; 3 pages; dated Oct. 4, 2021.

Australian Patent Office; Examination Report No. 1 issue in Application No. 2019234822; 3 pages; dated Sep. 8, 2020.

Australian Patent Office; Notice of Acceptance issue in Application No. 2019234822; 3 pages; dated Oct. 3, 2020.

European Patent Office, International Search Report and Written Opinion of Ser. No. PCT/US2019/022055; 18 pages; dated Sep. 3, 2019.

The Korean Intellectual Property Office; Notice of Office Action issued in Application No. 10-2020-7029358; 9 pages; dated Oct. 20, 2021.

Intellectul Property India; Examination Report issued in Application No. 202027036998; 6 pages; dated Nov. 22, 2021.

The Korean Intellectual Property Office; Allowance of Patent issued in Application No. 10-2020-7029358; 4 pages; dated Apr. 28, 2022.

Intellectul Property India; First Examination Report issued in Application No. 202228028653; 6 pages; dated Sep. 9, 2022.

Intellectul Property India; Examination Report issued in Application No. 202228028673; 6 pages; dated Sep. 9, 2022.

\* cited by examiner

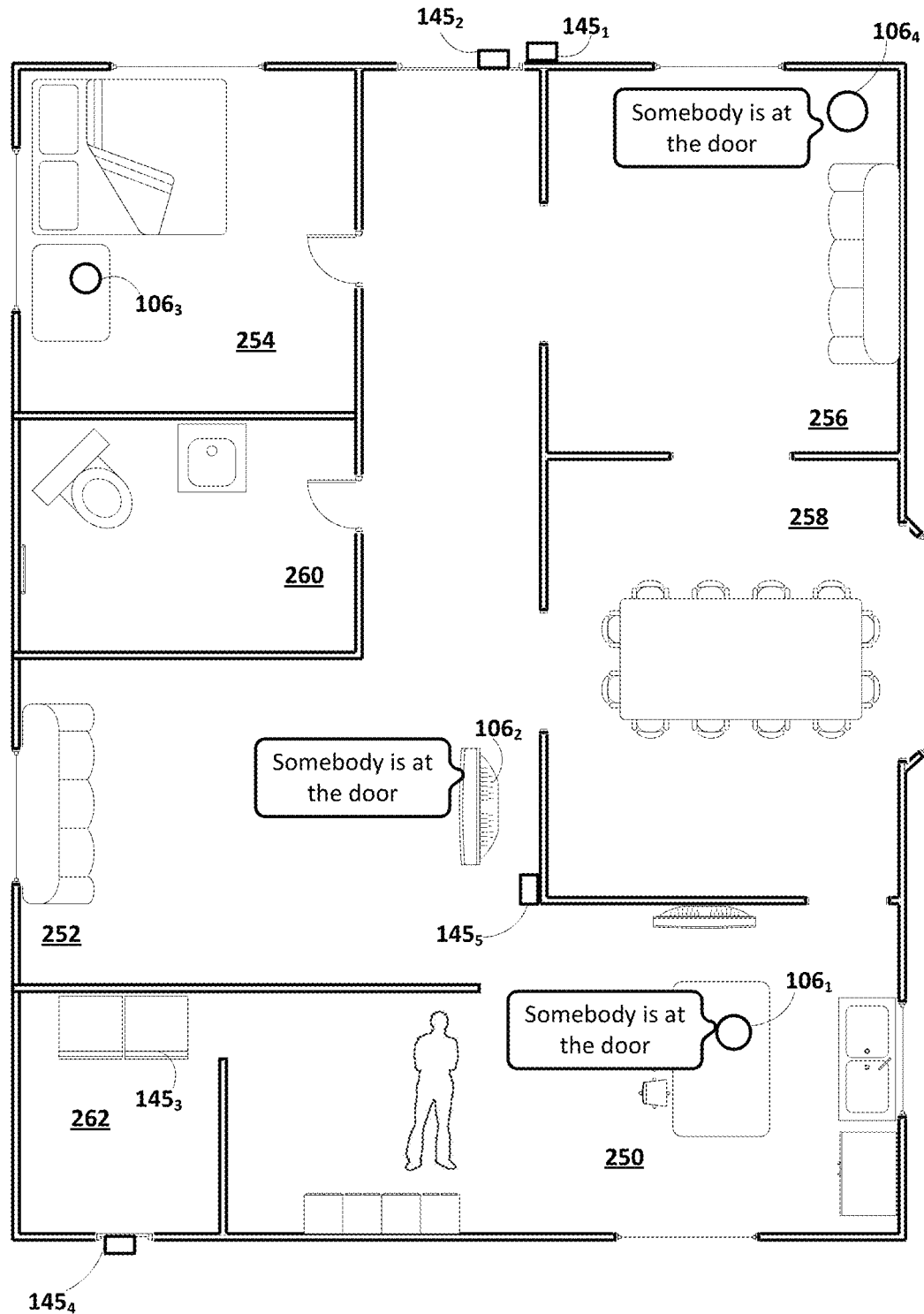
FIG. 2A1

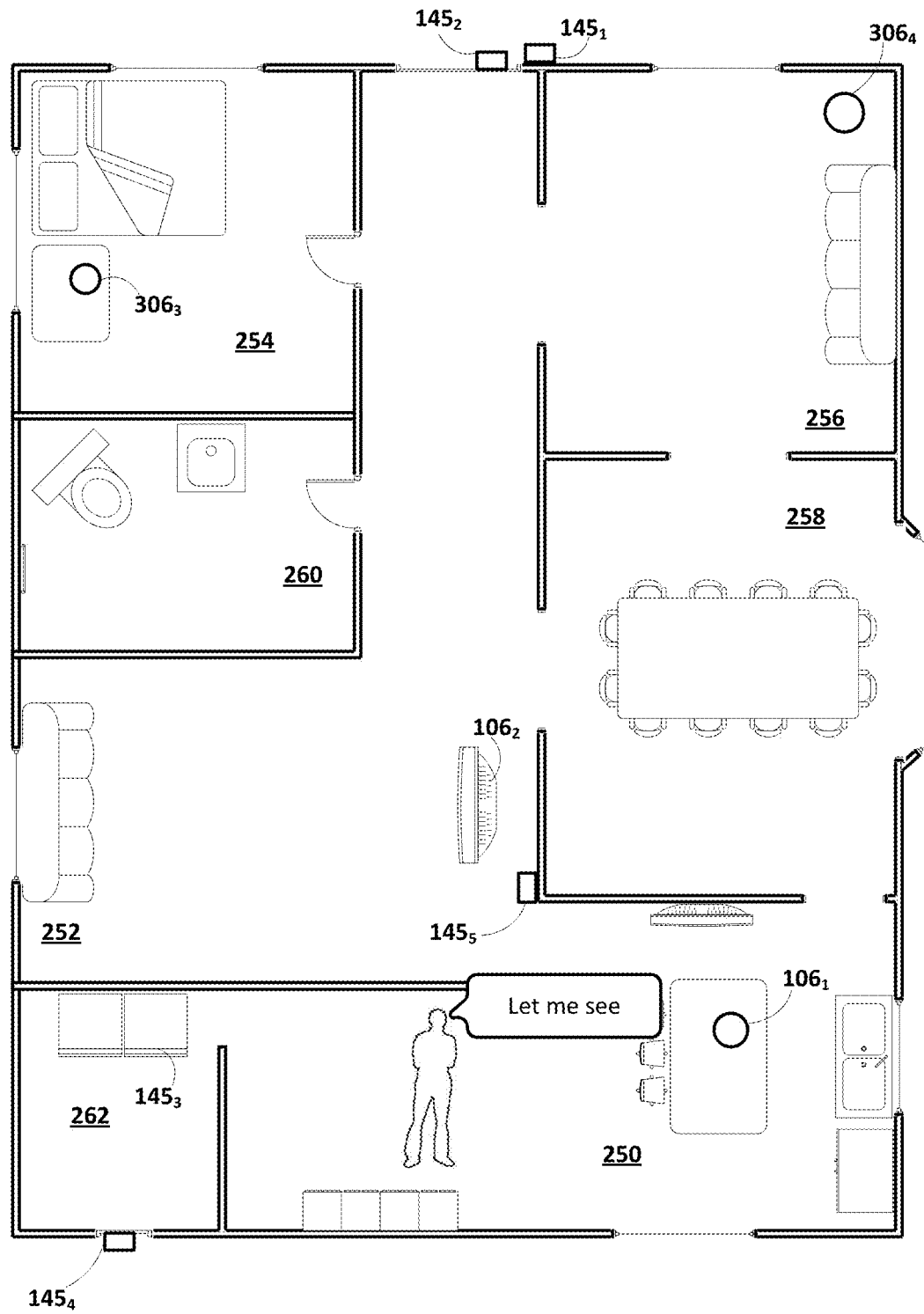
FIG. 2A2

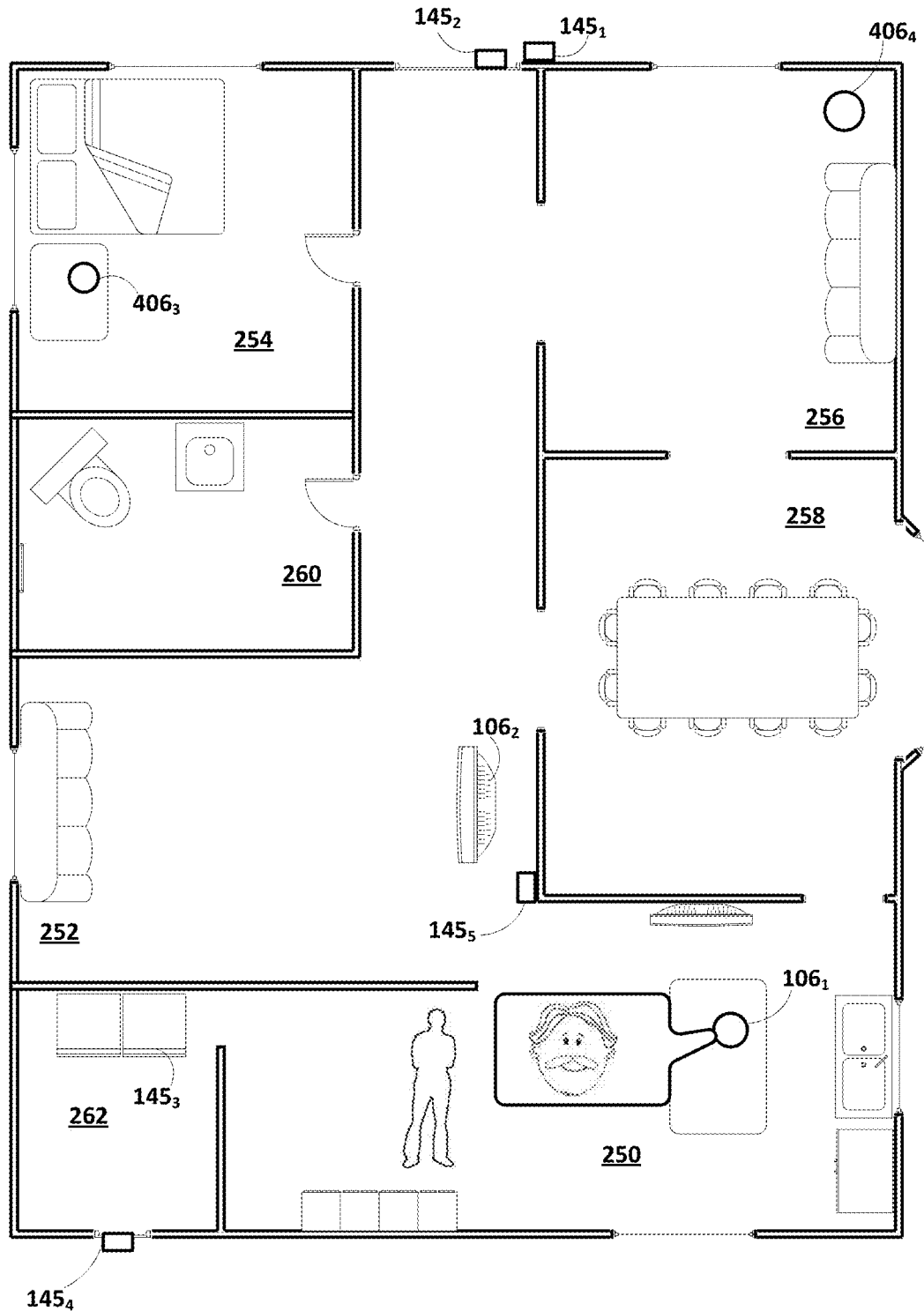
FIG. 2A3

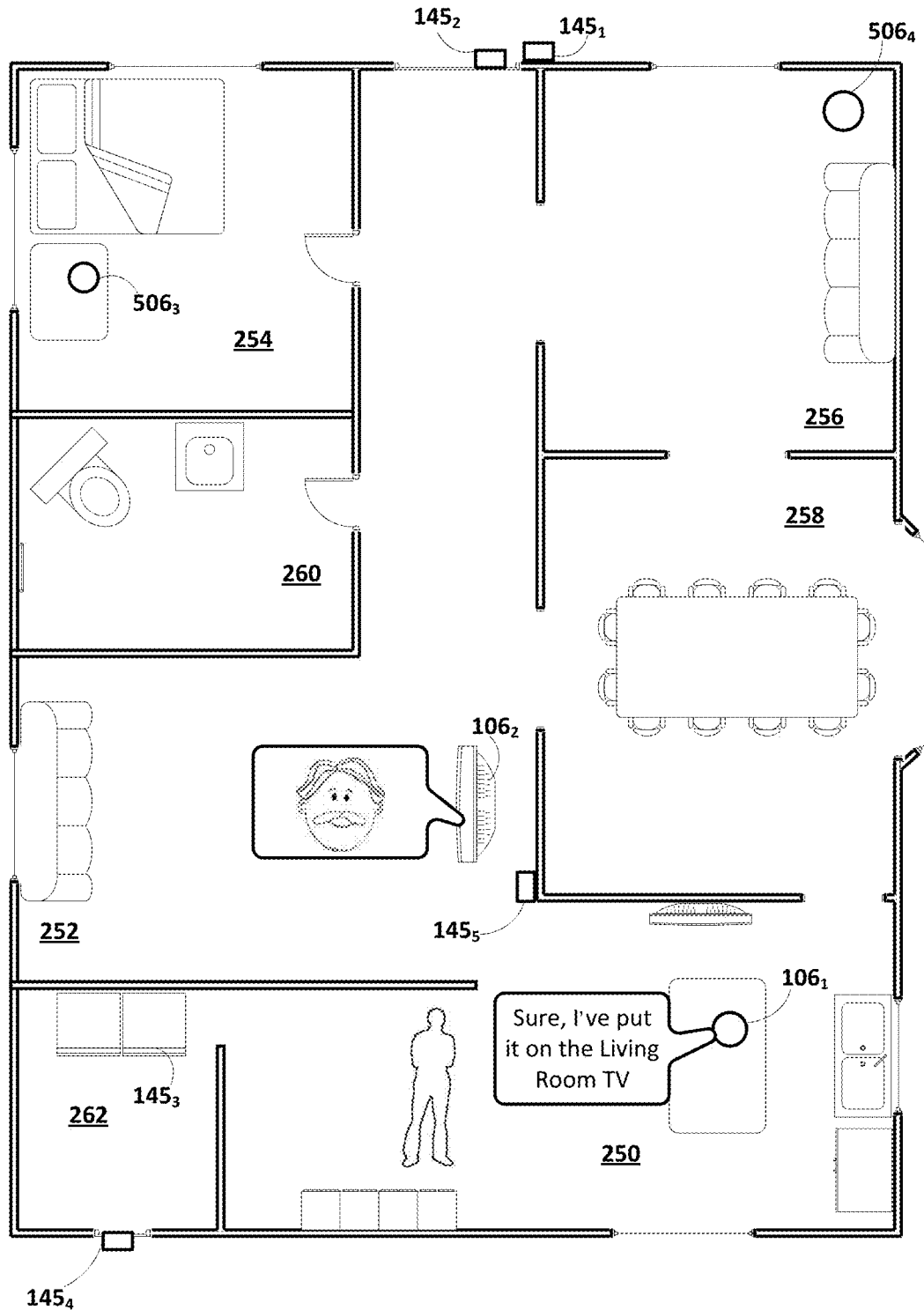
FIG. 2A4

GENERATING IOT-BASED NOTIFICATION(S) AND PROVISIONING OF COMMAND(S) TO CAUSE AUTOMATIC RENDERING OF THE IOT-BASED NOTIFICATION(S) BY AUTOMATED ASSISTANT CLIENT(S) OF CLIENT DEVICE(S)

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities. The input provided by the user can be, for example, spoken natural language input (i.e., utterances) which may in some cases be converted into text (or other semantic representation) and then further processed, and/or typed natural language input.

In some cases, automated assistants may include automated assistant clients that are executed locally by client devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), an audio recording of a spoken utterance of a user (or a text conversion thereof), and optionally data indicative of the user's identity (e.g., credentials). The cloud-based counterpart may perform various processing on the query to return result(s) to the automated assistant client, which may then provide corresponding output to the user.

Many users may engage automated assistants using multiple client devices. For example, some users may possess a coordinated "ecosystem" of client devices such as one or more smart phones, one or more tablet computers, one or more vehicle computing systems, one or wearable computing devices, one or more smart televisions, and/or one or more standalone interactive speakers, among other client devices. A user may engage in human-to-computer dialog with an automated assistant using any of these client devices (assuming an automated assistant client is installed). In some cases these client devices may be scattered around the user's primary residence, secondary residence, workplace, and/or other structure. For example, mobile client devices such as smart phones, tablets, smart watches, etc., may be on the user's person and/or wherever the user last placed them. Other client devices, such as traditional desktop computers, smart televisions, and standalone interactive speakers may be more stationary but nonetheless may be located at various places (e.g., rooms) within the user's home or workplace.

Techniques exist to enable user(s) (e.g., a single user, multiple users in a family, co-workers, co-inhabitants, etc.) to utilize an automated assistant client of any one of a coordinate ecosystem of client devices to control any one of a plurality of IoT devices that are associated with the automated assistant client. For example, a user can issue a spoken command of "turn off the living room lights" to an automated assistant client of a client device to cause corresponding IoT devices (i.e., lights linked to the automated assistant client and labeled as "living room" lights) to be turned off. Further, the automated assistant client can provide responsive output in response to the spoken command, such as responsive output that indicates that the command to turn off the lights was acted upon (and that optionally indicates whether it was successful).

Techniques also exist to enable user(s) to utilize an automated assistant client of a client device to explicitly request a state of an IoT device, and receive an indication of the state in response. For example, in response to a spoken utterance of "what is the thermostat setting", some automated assistants can determine a current temperature setting of a thermostat IoT device, and provide responsive output that indicates the current temperature setting. However, such techniques require that a user explicitly requests the state of the IoT device through user input provided via the automated assistant client of the client device. Further, such techniques can burden computational and/or network resources. For example, such techniques require that: the client device process a request of a user, the client device transmit data corresponding to the request to remote automated assistant component(s), the remote automated assistant component(s) interact with separate IoT systems to ascertain the state, and the remote automated assistant component(s) transmit a response indicative of the state to the client device.

SUMMARY

Implementations described herein relate to generating IoT-based notification(s) and provisioning of commands to cause automatic rendering of the IoT-based notification(s) by automated assistant client(s) of client device(s). For example, remote automated assistant component(s) (also referred to herein as "cloud-based automated assistant component(s)) can generate client device notification(s) based on a received IoT state change notification that indicates a change in at least one state associated with at least one IoT device. The generated client device notification(s) can each indicate the change in state associated with the at least one IoT device, and can optionally indicate the at least one IoT device. Further, the remote automated assistant component(s) can identify candidate assistant client devices (i.e., client devices that each include an automated assistant client) that are associated with the at least one IoT device, and determine whether each of the one or more of the candidate assistant client device(s) should render a corresponding client device notification. The remote automated assistant component(s) can then transmit a corresponding command to each of the assistant client device(s) it determines should render a corresponding client device notification, where each transmitted command causes the corresponding assistant client device to render the corresponding client device notification. For example, a command can be transmitted to a first assistant client device to cause the first assistant client device to automatically audibly render a client device notification, a command can be transmitted to a second assistant client device to cause the second assistant client device to automatically audibly render the same client device notification, etc. For instance, the commands can cause automatic rendering by the client devices independent of any user interface input that explicitly requests rendering of notifications—and even independent of any user interface input at all (e.g., rendering in response to receipt). As one particular instance, the commands can include text of the client device notification, and the commands can cause the assistant client devices to perform text-to-speech conversion of the text, and render corresponding audio data via their speaker(s).

In some implementations described herein, a command transmitted to an assistant client device to cause the assistant client device to render a client device notification can also cause the client device to automatically monitor for voice input for a period of time after the client device notification has been at least partially rendered, and to transmit data corresponding to a spoken utterance detected during the automatic monitoring. In this manner, a user can provide a spoken utterance that is related to the client device notification with a reduced amount of input, as the user does not first have to explicitly invoke the assistant client of the assistant client device (e.g., by first speaking an invocation phrase such as "Hey, Assistant" or pushing an invocation button). This can conserve resources of the assistant client device as the input(s) to invoke the automated assistant client do not have to be processed by the assistant client device.

Further, in some of those implementations, the automated assistant (automated assistant client device and/or remote automated assistant component(s)) processes the spoken utterance and performs further assistant action(s) based on processing of the spoken utterance and based on the spoken utterance being detected during the automatic monitoring for the voice input. For example, the automated assistant can generate the further assistant action(s) based on text generated from performing a speech-to-text conversion of the spoken utterance, and based on value(s) inferred based on the spoken utterance being detected during the monitoring for the voice input. The inferred value(s) can be based on the client device notification and/or the IoT state change notification on which the client device notification was based. As one particular example, if the client device notification is "your front door lock is unlocked" and the spoken utterance provided during the monitoring is "lock it", the automated assistant can infer a value of "front door lock" for "it", and generate and transmit an IoT command that causes the "unlocked" state of the "front door lock" to be altered to a "locked" state. In these and other manners, a user can provide a shorter spoken utterance in response to a client device notification, as value(s) that would normally be required in a spoken utterance can instead be inferred as described above. This can conserve resources of the assistant client device and/or remote automated assistant component(s), as less audio data needs to be transmitted and/or processed (e.g., speech-to-text) due to the shorter spoken utterance.

In some additional or alternative implementations described herein, the remote automated assistant component(s) determine which client device(s) (if any) should be caused to render a client device notification in response to a received IoT state change notification. The remote automated assistant component(s) can determine which client device(s) (if any) should be caused to render a client device notification based on properties of the received IoT state change notification, current properties associated with the client device(s), time of day, day of the week, and/or one or more other criteria. Based on such considerations, the remote automated assistant component(s) can therefore selectively transmit commands to less than all (and in some cases, to none) assistant client devices in response to received IoT state change notifications. In these and other manners, every IoT state change notification for every IoT device associated with an ecosystem of client devices does not cause every client device of the ecosystem to render a corresponding client device notification. Rather, less than all (and in some cases, none) of the client device(s) render a corresponding client device notification for one or more state change notifications. This can conserve computational resources at a client device as a result of commands not being transmitted to or processed by the client device in various situations. Further, this can also conserve network resources by reducing a quantity of commands that need to be transmitted in various situations.

The above description is provided as an overview of only some implementations of the present disclosure. Further description of those implementations, and other implementations, are described in more detail herein. As one non-limiting example, various implementations are described in more detail in the claims included herein.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 2A1, 2A2, 2A3, 2A4, 2B, 2C, and 2D depict some examples associated with client device(s) automatically rendering IoT-based client device notifications, in accordance with various implementations.

FIG. 3 illustrates an example state diagram in accordance with various implementations.

FIG. 4 illustrates another example state diagram in accordance with various implementations.

DETAILED DESCRIPTION

Figure 1:
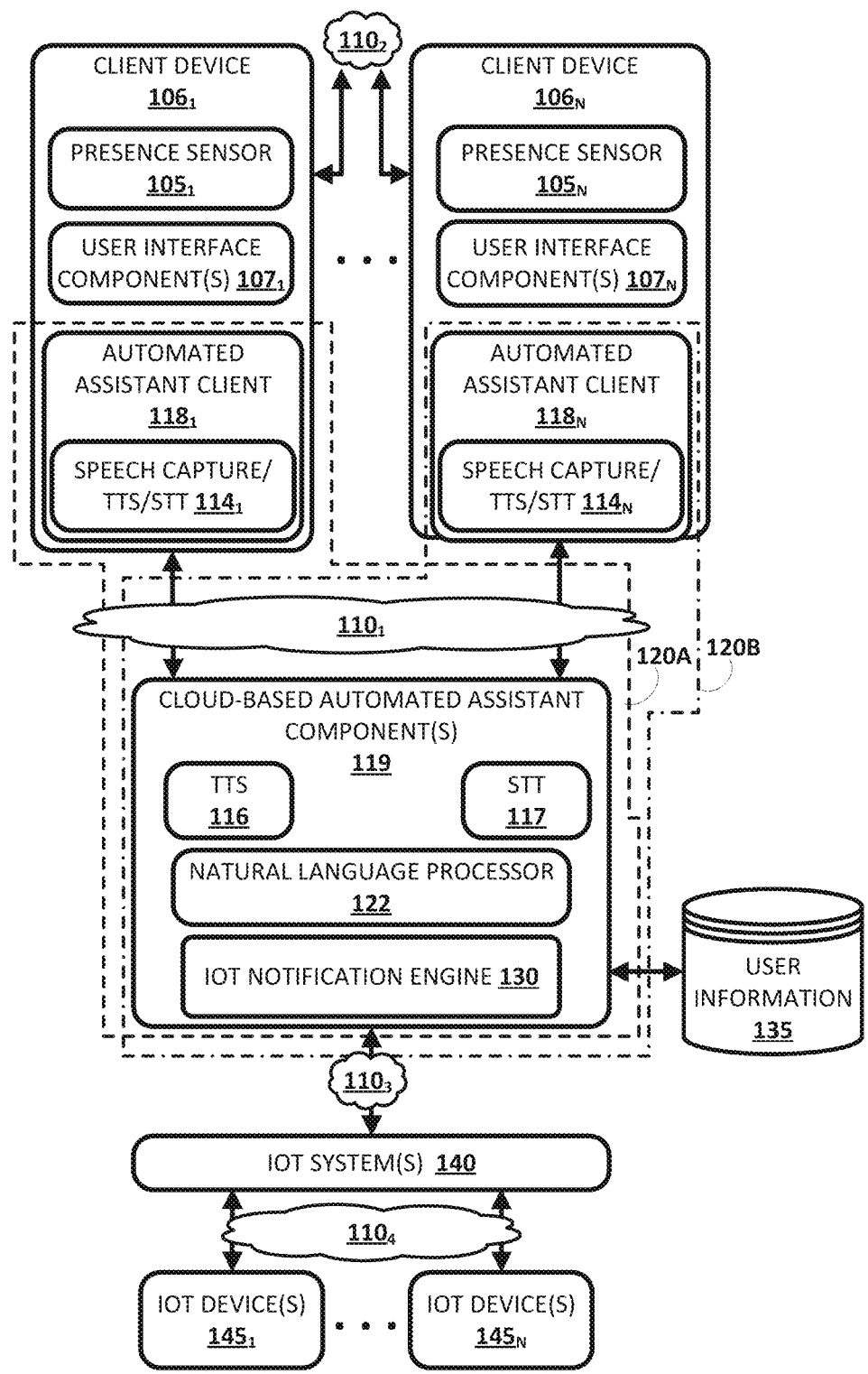
FIG. 1 is a block diagram of an example environment in which implementations disclosed herein may be implemented.

There is a proliferation of smart, multi-sensing network connected devices (also referred to herein as IoT devices) such as sound speakers, home alarms, door locks, cameras, lighting systems, treadmills, thermostats, weight scales, smart beds, irrigation systems, garage door openers, appliances, baby monitors, fire alarms, moisture detectors, etc. Often, multiple IoT devices are located within the confines of a structure, such as a home—or located within multiple related structures, such as a user's primary residence and the user's secondary residence and/or work location.

Further, there is a proliferation of assistant client devices that each include an assistant client that can interact with one or more remote automated assistant components to form a logical instance of an assistant. An assistant client device can be devoted solely to assistant functionality (e.g., a standalone speaker and/or standalone audio/visual device including only an assistant client and associated interface, and devoted solely to assistant functionality) or can perform assistant functionality in addition to other functions (e.g., a mobile phone or tablet that includes an assistant client as one of multiple applications). Moreover, some IoT devices can also be assistant client devices. For example, some IoT devices can include an assistant client and at least speaker(s) and/or microphone(s) that serve (at least in part) as user interface output and/or input devices for an assistant interface of the assistant client.

Various techniques have been proposed for associating IoT devices with corresponding logical instances of automated assistants (and optionally with individual assistant client devices). For example, a user, group of users, an assistant client device, and/or a group of assistant client devices (e.g., all within a structure) can be linked (e.g., in one or more databases) with a plurality of disparate IoT devices to enable interaction with (e.g., control of) the IoT devices via automated assistants. For instance, each of multiple assistant client devices in a household can be linked to each of multiple disparate IoT devices in the household to enable any user (or a restricted group of users) to interface with any one of the assistant client devices to interact with any one of the multiple disparate IoT devices.

One example of such linking is a device topology representation that can be user created, and/or automatically created, and that may define various assistant client devices, various IoT devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or alias(es) for the device (e.g. couch lamp, front door lock, bedroom speaker, kitchen assistant, etc.). In this manner, the identifiers of devices can be names, aliases, and/or locations of the respective devices that the user is likely to associate with the respective devices.

The device topology representation can further specify one or more device attributes associated with the respective devices. The device attributes for an assistant client device can be, for example, associated with one or more input and/or output modalities supported by the assistant client device. For instance, a device attribute for a standalone speaker-only assistant client device can indicate that it is capable of providing audible output, but incapable of providing visual output. The device attributes of an IoT device can be, for example, associated with one or more states associated with the IoT device, such as state(s) that can be determined by the IoT device itself and/or state(s) that data from the IoT device can be utilized in determining. For instance, the device attributes associated with a lighting device can include an on state, an off state, a dimming state, etc. As another example, an automatic door locking device can include a locked state and an unlocked state. As yet another example, a smart doorbell with a camera can include a ring state (e.g., activated when a button of the smart doorbell is actuated), an object detection state (e.g., based on data from the camera), etc.

Implementations described herein relate to receiving, by remote automated assistant component(s), IoT state change notifications generated in response to state changes of a variety of IoT devices. Those implementations further relate to determining, by remote automated assistant component(s) based on various criteria, when and/or how to cause rendering of corresponding client device notifications via assistant interfaces of client device(s) that are associated with those IoT devices. Yet further, those implementations relate to transmitting, when it is determined IoT-based client device notification(s) should be rendered, command(s) to client device(s) to cause assistant interface(s) of those client device(s) to automatically render the client device notification(s), and optionally render them in a determined manner.

Now turning to FIG. 1, an example environment in which techniques disclosed herein may be implemented is illustrated. The example environment includes a plurality of client computing devices $106_{1-N}$ (also referred to herein simply as "client devices"), one or more cloud-based automated assistant components 119, one or more IoT systems 140, IoT devices $145_{1-N}$, and a user information database 135. The client devices 106 and IoT devices 145 of FIG. 1 represent client devices and IoT devices that are at least selectively associated with one another (e.g., via a device topology). For example, the IoT devices 145 can all be at a home (e.g., in the interior and/or exterior of the home), the client devices 106 can be at least occasionally in the same home, and the IoT devices 145 and the client devices 106 can be linked to one another utilizing one or more techniques, such as those described herein. Through such association, one or more users can utilize automated assistant clients 106 to interact with the IoT devices 145 and/or notifications relating to one or more of the IoT devices 145 can be caused to be automatically rendered at one or more of the client devices 106 according to implementations described herein.

Each client device 106 can execute a respective instance of an automated assistant client 118. An instance of the automated assistant client 118 can be an application that is separate from an operating system of the client device 116 (e.g., installed "on top" of the operating system)—or can alternatively be implemented directly by the operating system of the client device 116.

One or more cloud-based automated assistant components 119 can be implemented on one or more computing systems (collectively referred to as a "cloud" or a "remote" computing system) that are communicatively coupled to client devices $106_{1-N}$ via one or more local area networks ("LANs," including Wi-Fi LANs, mesh networks, etc.) and/or wide area networks (e.g., the Internet). The communicative coupling of the cloud-based automated assistant components 119 with the client devices $106_{1-N}$ is indicated generally by $110_1$ of FIG. 1.

The cloud-based automated assistant components 119 can also be communicatively coupled with one or more IoT systems 140 via one or more networks. The communicative coupling of the cloud-based automated assistant components 119 with the IoT system(s) 140 is indicated generally by $110_3$ of FIG. 1. Further, the IoT systems 140 can each be communicatively coupled to a corresponding group of one or more IoT devices $145_{1-N}$ via one or more networks. For example, a first IoT system 140 can be communicatively coupled with, and receive data from, a first group of one or more IoT devices $145_1$, and a second IoT system 140 can be communicatively coupled with, and receive data from, a second group of one or more IoT devices $145_N$, etc. The communicative coupling of the IoT system(s) 140 with the IoT devices 145 is indicated generally by $110_4$ of FIG. 1. Also, in some embodiments, the plurality of client devices $106_{1-N}$ may be communicatively coupled with each other via one or more networks, indicated generally by $110_1$ of FIG. 1.

In some implementations, the plurality of client computing devices $106_{1-N}$ and IoT devices $145_{1-N}$ can be associated with each other in various ways in order to facilitate performance of techniques described herein. For example, in some implementations, the plurality of client computing devices $106_{1-N}$ and IoT devices $145_{1-N}$ may be associated with each other by virtue of being communicatively coupled via one or more LANs. This may be the case, for instance, where plurality of client computing devices $106_{1-N}$ are deployed across a particular area or environment, such as a home, a building, and so forth. Additionally or alternatively, in some implementations, plurality of client computing devices $106_{1-N}$ and IoT devices $145_{1-N}$ may be associated with each other by virtue of them being members of a coordinated ecosystem of client devices 106 and IoT devices $145_{1-N}$ that are at least selectively accessible by one or more users (e.g., an individual, a family, employees of an organization, other predefined groups, etc.). In some of those implementations, the ecosystem of client devices 106 and IoT devices $145_{1-N}$ can be manually and/or automatically associated with each other in a device topology.

An instance of an automated assistant client 118, by way of its interactions with one or more cloud-based automated assistant components 119, may form what appears to be, from a user's perspective, a logical instance of an automated assistant 120 with which the user may engage in a human-to-computer dialog. Two instances of such an automated assistant 120 are depicted in FIG. 1. A first automated assistant 120A encompassed by a dashed line includes automated assistant client $118_1$ of client device $106_1$ and one or more cloud-based automated assistant components 119. A second automated assistant 120B encompassed by a dash-dash-dot line includes automated assistant client $118_N$ of client device $106_N$ and one or more cloud-based automated assistant components 119. It thus should be understood that each user that engages with an automated assistant client 118 executing on a client device 106 may, in effect, engage with his or her own logical instance of an automated assistant 120 (or a logical instance of automated assistant 120 that is shared amongst a household or other group of users). For the sakes of brevity and simplicity, the term "automated assistant" as used herein will refer to the combination of an automated assistant client 118 executing on a client device 106 and one or more cloud-based automated assistant components 119 (which may be shared amongst multiple automated assistant clients 118). Although only a plurality of associated client devices 106 are illustrated in FIG. 1, it is understood that cloud-based automated assistant component(s) 119 can additionally serve many additional groups of associated client devices.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

The IoT system(s) 140 can include one or more third-party (3P) systems and/or one or more first-party (1P) systems. A third-party system, as used herein, references a system that is controlled by a party that is distinct from the party that controls an automated assistant being referenced. A first-party system references a system that is controlled by a party that is the same as the party that controls an automated assistant being referenced.

IoT systems 140 receive data from IoT devices 145 that are communicatively coupled thereto, and selectively transmit IoT state change notifications, that are based on the received data, to the cloud-based automated assistant components 119. For example, assume IoT device(s) $145_1$ include a smart doorbell IoT device. In response to an individual pressing a button on the doorbell IoT device, the doorbell IoT device can transmit corresponding data to one of the IoT system(s) 140 (e.g., one of the IoT system(s) managed by a manufacturer of the doorbell). The one of the IoT system(s) 140 can determine a change in a state of the doorbell IoT device based on such data. For instance, the one of the IoT system(s) 140 can determine a change in the doorbell from an inactive state (e.g., no recent pressing of the button) to an active state (recent pressing of the button). Further, the one of the IoT system(s) 140 can transmit a corresponding IoT state change notification to the cloud-based automated assistant component(s) 119. The transmitted IoT state change notification can be structured data that includes, for example, a state indication that indicates the change in the state associated with the at least one IoT device (e.g., that indicates a "doorbell ring" or "somebody at the door"), a unique identifier that enables the cloud-based automated assistant component(s) 119 to identify client device(s) associated with the at least one IoT device, and optionally an indication of the at least one IoT device (e.g., a general indication of "doorbell", a more specific indication of "front door doorbell", or even a unique identifier that is specific to that doorbell). It is noted that in some implementations, a unique identifier that is specific to that doorbell may also serve as a unique identifier that enables the automated assistant to identify client device(s) associated with the at least one IoT device. For example, the unique identifier that is specific to that doorbell can be utilized to identify the doorbell in a device topology, and the client device(s) associated with that doorbell in the device topology identified.

The cloud-based automated assistant component(s) 119 can utilize the unique identifier of a received IoT state change notification to identify one or more candidate client devices. For example, an IoT notification engine 130 can identify client devices 106 of FIG. 1 for a received IoT state change notification, based on an included unique identifier being mapped (directly or indirectly) to the client devices 106 in user information database 135. For instance, the IoT notification engine 130 can utilize the unique identifier to identify an assistant account in user information database 135, and can identify client device(s) 106 that are linked, in the user information database 135, to that assistant account and optionally linked with the at least one IoT device indicated in the IoT state change notification (e.g., when different client device(s) for the assistant account are linked to different IoT device(s)). As another example, the unique identifier can be a unique identifier that is specific to the at least one IoT device, and the IoT notification engine 130 can utilize the unique identifier to identify the at least one IoT device in the user information database 135 and to identify client devices 106 that are linked, in the database 135, to that IoT device. The IoT notification engine 130 can leverage one or more device topology representations and/or other data structures in the user information database 135 in identifying candidate client devices.

The IoT notification engine 130 can further generate client device notification(s) for one or more of the identified client device(s) 106. The IoT notification engine 130 component(s) can generate a client device notification based on the state change notification and optionally based on one or more properties of a client device 106 at which the client device notification is to be rendered. For example, IoT notification engine 130 can generate a client device notification that includes textual content that is selected based on the state indication of the IoT state change notification and based on the indication of the at least one IoT device of the state change notification. For example, the textual content can be "somebody is at the front door" and "somebody is at" can be selected based on the state indication indicating a "doorbell ring" and "the front door" can be selected based on the indication of the at least one IoT device including a descriptor of "front door" or being mapped to a device with a descriptor (e.g., in a device topology representation) of "front door".

As another example, a stored template can be selected based on one or more properties of the state change notification, and the IoT notification engine 130 can fill in the template based on the state change notification. For instance, a template of [[<"somebody" if person=unknown>, <"friend" if person=known, but no description>, or <"description" if person=known, with description>] "is at <IoT descriptor>"] can be assigned to state change notifications indicating a "doorbell ring" and can be utilized by the IoT notification engine 130 to generate the textual content. For instance, a received IoT state change notification can include a state indication that indicates a "doorbell ring", an indication of the at least one IoT device that is a textual descriptor of "front door", and additional data that indicates the doorbell ring is by a known person with a description of "Bob". In such an instance, the template can be used to generate textual content of "Bob is at front door", where "Bob" is included based on the included description of the person and based on the condition "if person=known, with description" of the template being satisfied by the IoT state change notification. On the other hand, if the IoT state change notification instead indicated the doorbell ring is by an unknown person, the template can be used to generate textual content of "somebody is at the front door", where "somebody" is included based on the condition "if person=unknown" of the template being satisfied by the IoT state change notification.

The IoT notification engine 130 can determine whether each of the one or more of the assistant client device(s) 106 should render a corresponding client device notification. The IoT notification engine 130 can then transmit a corresponding command to each of the client device(s) 106 it determines should render a corresponding client device notification (if any), where each transmitted command causes the corresponding client device 106 to render the corresponding client device notification. For example, IoT notification engine 130 can transmit a command to client device $106_1$ to cause client device $106_1$ to automatically audibly render a client device notification, and the IoT notification engine 130 can transmit a command to client device $106_N$ to cause client device $106_N$ to automatically audibly render the same client device notification, etc. For instance, the commands can cause automatic rendering by the client devices independent of any user interface input that explicitly requests rendering of notifications—and even independent of any user interface input at all (e.g., rendering in response to receipt). In such an instance, the commands can further cause immediate automatic rendering. That is, rendering by a client device as soon as possible following receipt of the command, recognizing slight delays may be present in processing the command and/or in processing required for the rendering.

In some implementations, the IoT notification engine 130 can determine which client device(s) (if any) should be caused to render a client device notification based on properties of the received IoT state change notification, current properties associated with the client device(s), time of day, day of the week, and/or one or more other criteria. Based on such considerations, the IoT notification engine 130 can therefore selectively transmit commands to less than all (and in some cases, to none) assistant client devices in response to received IoT state change notifications.

In some implementations, a command transmitted to a client device 106 by the IoT notification engine 130 to cause the client device to render a client device notification can also cause the client device to automatically monitor for voice input for a period of time after the client device notification has been at least partially rendered, and to transmit data (e.g., audio data or a conversion thereof) corresponding to a spoken utterance detected during the automatic monitoring. The cloud based automated assistant component(s) 119 can receive and process the transmitted data and perform further assistant action(s) based on processing of the spoken utterance and based on the spoken utterance being detected during the automatic monitoring for the voice input. For example, the automated assistant can generate the further assistant action(s) based on text generated from performing a speech-to-text conversion of the spoken utterance, and based on value(s) inferred based on the spoken utterance being detected during the monitoring for the voice input. The inferred value(s) can be based on the client device notification and/or the IoT state change notification on which the client device notification was based. As one particular example, if the client device notification is "your smart vacuum is reporting a broken brush" and the spoken utterance provided during the monitoring is "where can I get a new one", the automated assistant can infer a value of "smart vacuum brush" for "one", generate responsive content based on "where can I get a new smart vacuum brush", and provide the responsive content for rendering via the client device. Additional description of implementations of the IoT notification engine 130 is provided herein (e.g., in description related to FIGS. 2A1-5).

In various implementations, one or more of the client computing devices $106_{1-N}$ may include one or more presence sensors $105_{1-N}$ that are configured to provide, with approval from corresponding user(s), signals indicative of detected presence, particularly human presence. In some of those implementations, the IoT notification engine 130 can determine a client device notification should be rendered only at client device(s) 106 where a user (and optionally a particular user) is currently near and/or was recently near. As described herein, the IoT notification engine 130 can leverage data determined based on presence sensors $105_{1-N}$ in determining those client device(s) 106 where a user is near or was recently near, and provide corresponding commands to only those client device(s) 106. In some additional or alternative implementations, the IoT notification engine 130 can leverage data determined based on presence sensors $105_{1-N}$ in determining whether any user(s) (any users or specific users) are currently proximal to any of the client device(s) 106, and suppress provision of commands based when it is determined that no users (any users or specific users) are proximal to any of the client device(s) 106. Accordingly, in these and other manners, commands that would have otherwise been provided (absent determining that no users are proximal to any of the client device(s) 106) can be suppressed, thereby mitigating undue consumption of resources of those client devices 106.

Presence sensors 105$_{1-N}$ may come in various forms. Some client devices 106 may be equipped with one or more digital cameras that are configured to capture and provide signal(s) indicative of movement detected in their fields of view. Additionally or alternatively, some client devices 106 may be equipped with other types of light-based presence sensors 105, such as passive infrared ("PIR") sensors that measure infrared ("IR") light radiating from objects within their fields of view. Additionally or alternatively, some client devices 106 may be equipped with presence sensors 105 that detect acoustic (or pressure) waves, such as one or more microphones. Moreover, in addition to client devices 106, some IoT devices 145 can additionally or alternatively include presence sensors 105, and provided signals from such sensors can additionally be utilized by an automated assistant in determining whether and/or how to render notifications according to implementations described herein.

Additionally or alternatively, in some implementations, presence sensors 105 may be configured to detect other phenomena associated with human presence. For example, in some embodiments, a client device 106 may be equipped with a presence sensor 105 that detects various types of waves (e.g., radio, ultrasonic, electromagnetic, etc.) emitted by, for instance, a mobile client device 106 carried/operated by a particular user. For example, some client devices 106 may be configured to emit waves that are imperceptible to humans, such as ultrasonic waves or infrared waves, that may be detected by other client devices 106 (e.g., via ultrasonic/infrared receivers such as ultrasonic-capable microphones).

Additionally or alternatively, various client devices 106 may emit other types of human-imperceptible waves, such as radio waves (e.g., Wi-Fi, Bluetooth, cellular etc.) that may be detected by one or more other client devices 106 and used to determine an operating user's particular location. In some implementations, Wi-Fi triangulation may be used to detect a person's location, e.g., based on Wi-Fi signals to/from a client device 106. In other implementations, other wireless signal characteristics, such as time-of-flight, signal strength, etc., may be used by various client devices 106, alone or collectively, to determine a particular person's location based on signals emitted by a client device 106 they carry.

Additionally or alternatively, in some implementations, one or more client devices 106 may perform voice recognition to recognize an individual from their voice. For example, some automated assistants 120 may be configured to match a voice to a user's profile, e.g., for purposes of providing/restricting access to various resources. In some implementations, movement of the speaker may then be determined, e.g., by one or more other presence sensors that may be incorporated, for instance, in IoT devices. In some implementations, based on such detected movement, a location of the individual may be predicted, and this location may be assumed to be the individual's location when a client device notification is caused to be rendered at one or more client devices based on proximity of those client device(s) to the individual's location. In some implementations, an individual may simply be assumed to be in the last location at which he or she engaged with automated assistant 120, especially if not much time has passed since the last engagement.

Each of the client computing devices 106$_{1-N}$ further includes user interface component(s) 107$_{1-N}$, which can each include one or more user interface input devices (e.g., microphone, touchscreen, keyboard) and/or one or more user interface output devices (e.g., display, speaker, projector). As one example, user interface components 107$_1$ can include only speaker(s) and microphone(s), whereas user interface components 107$_N$ can include speaker(s), a touchscreen, and microphone(s).

Each of the client computing devices 106$_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices 106$_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices 106$_{1-N}$ may operate an automated assistant client 118. In various embodiments, each automated assistant client 118 may include a corresponding speech capture/text-to-speech (TTS)/speech-to-text (STT) module 114. In other implementations, one or more aspects of speech capture/TTS/STT module 114 may be implemented separately from automated assistant client 118.

Each speech capture/TTS/STT module 114 may be configured to perform one or more functions: capture a user's speech (speech capture, e.g., via a microphone (which in some cases may comprise presence sensor 105)); convert that captured audio to text and/or to other representations or embeddings (STT); and/or convert text to speech (TTS). In some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., text formulated by automated assistant 120) into computer-generated speech output. In some implementations, TTS module 116 may provide the computer-generated speech output to client device 106 to be output directly, e.g., using one or more speakers. In other implementations, textual data (e.g., a client device notification included in a command) generated by automated assistant 120 may be provided to speech capture/TTS/STT module 114, which may then locally convert the textual data into computer-generated speech that is rendered via local speaker(s).

Automated assistant 120 (and in particular, cloud-based automated assistant components 119) may include a natural language processor 122, the aforementioned TTS module 116, the aforementioned STT module 117, and other components, some of which are described in more detail below. In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices $106_{1-N}$. As used herein, free-form input is input that is formulated by a user and that is not constrained to a group of options presented for selection by the user.

Natural language processor 122 of automated assistant 120 processes natural language input generated by users via client devices $106_{1-N}$ and may generate annotated output for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related data outside of the particular natural language input to determine one or more annotations—such as a client device notification rendered immediately prior to receiving the natural language input and/or a IoT state change notification on which the client device notification is based.

Additional description of various components of FIG. 1 is now provided with reference to FIGS. 2A1, 2A2, 2A3, 2A4, 2B, 2C, and 2D. A home floorplan is depicted in each of those figures. The depicted floorplan includes a plurality of rooms, 250-262. A plurality of client devices $106_{1-4}$ are deployed throughout at least some of the rooms. Each client device 106 may implement an instance of automated assistant client 118 configured with selected aspects of the present disclosure and may include one or more input devices, such as microphones, that are capable of capturing utterances spoken by a person nearby. For example, a first client device $106_1$ taking the form of a standalone interactive speaker and display device (e.g., display screen, projector, etc.) is deployed in room 250, which in this example is a kitchen. A second client device $106_2$ taking the form of a so-called "smart" television (e.g., a networked television with one or more processors that implement an instance of automated assistant client 118) is deployed in room 252, which in this example is a den. A third client device $106_3$ taking the form of an interactive standalone speaker is deployed in room 254, which in this example is a bedroom. A fourth client device $106_4$ taking the form of another interactive standalone speaker is deployed in room 256, which in this example is a living room.

While not depicted in FIG. 2, the plurality of client devices $106_{1-4}$ may be communicatively coupled with each other and/or other resources (e.g., the Internet) via one or more wired or wireless LANs (e.g., $110_2$ in FIG. 1). Additionally, other client devices—particularly mobile devices such as smart phones, tablets, laptops, wearable devices, etc.—may also be present, e.g., carried by one or more persons in the home and may or may not also be connected to the same LAN. It should be understood that the configuration of client devices depicted in FIG. 2 is just one example; more or fewer and/or different client devices 106 may be deployed across any number of other rooms and/or areas other than a home.

Further depicted in each of FIGS. 2A1-2D are a plurality of IoT devices $145_{1-5}$. For example, a first IoT device $145_1$ taking the form of a smart doorbell is deployed on the exterior of the home near a front door of the home. A second IoT device $145_2$ taking the form of a smart lock is deployed on the exterior of the home on the front door of the home. A third IoT device $145_3$ taking the form of a smart clothes washer is deployed in room 262, which in this example is a laundry room. A fourth IoT device $145_4$ taking the form of a door open/close sensor is deployed near a rear door in the room 162, and detects whether the rear door is open or closed. A fifth IoT device $145_5$ taking the form of a smart thermostat is deployed in room 252, which in this example is a den.

Each IoT device 145 can communicate (e.g., via the Internet) with a respective IoT system 140 (FIG. 1) to provide data to the IoT system and optionally to be controlled based on commands provided by the IoT system. It should be understood that the configuration of IoT devices 145 depicted in FIGS. 2A1-2D is just one example; more or fewer and/or different IoT devices 145 may be deployed across any number of other rooms and/or areas other than a home.

FIG. 2A1 illustrates client devices $106_1$, $106_2$, and $106_4$ all rendering the same audible client device notification of "Somebody is at the door" via respective speaker(s). The client devices $106_1$, $106_2$, and $106_4$ can each provide the audible notification in response to a received command transmitted by cloud-based automated assistant component(s) 119. For example, each command can include the client device notification text of "somebody is at the door" as well as an indication that the client device should perform text-to-speech processing of the text and cause the resulting speech audio data to be immediately and automatically audibly rendered. As another example, each command can include audio data (e.g., generated based on text-to-speech processing TTS component 116) that includes speech for the client device notification text of "somebody is at the door", as well as an indication that the client device should cause the audio data to be immediately and automatically audibly rendered.

The IoT notification engine 130 can generate the client device notification and cause the corresponding commands to be transmitted in response to receiving a corresponding IoT state notification from one of the IoT systems 140. For example, one of the IoT systems 140 can provide an IoT state notification that indicates a doorbell ring for the smart doorbell IoT device $145_1$. The IoT state notification can be generated and provided by the one of the IoT systems in response to receiving corresponding data from the smart doorbell IoT device $145_1$.

Notably, in FIG. 2A1 the client device $106_3$ does not provide any output corresponding to the client device notification. This can be a result of the client device $106_3$ not receiving a command from the cloud-based automated assistant component(s) 119. The IoT notification engine 130 can determine to not cause rendering of the client device notification at the client device $106_3$ (and resultantly not to provide a command thereto) based on various criteria. By not causing rendering of the client device notification at the client device $106_3$, the resources of the client device $106_3$ can be conserved. Furthermore, by not providing a command to the client device $106_3$, the resources of the cloud-based automated assistant component(s) 119 may also be conserved. Network resources which would otherwise be used to provide the command from the cloud-based automated assistant component(s) 119 to the client device $106_3$ may also be conserved. As one example, manually created and/or automatically determined rules stored in user information database 135 can dictate that the client device $106_3$ should never render any notifications and the notification engine 130 can exclude the client device $106_3$ based on such rules. As another example, rule(s) stored in user information database 135 can dictate that the client device $106_3$ should never render particular types of notifications, such as "doorbell ring" notifications or notifications from doorbell IoT device $145_1$, and the notification engine 130 can exclude the client device $106_3$ based on such rules. As yet another example, rule(s) stored in user information database 135 can dictate that the client device $106_3$ should never render particular types of notifications when one or more other conditions are satisfied, such as it being a particular time of day, it being a particular day of the week, there being a lack of detected presence of a user (any user or a particular user) near the client device $106_3$, and/or the client device $106_3$ being in one or more predefined states (e.g., a "sleep" state, a state where it is actively providing any other type of output, a state where it is actively providing a particular type of output (e.g., music), etc.)—and the notification engine 130 can exclude the client device $106_3$ based on such rules. Any manually curated rules in user information database 135 can include one or both of global rules that apply across a plurality of users or a plurality of ecosystems, and more granular rules that may only apply to a single user or a single ecosystem (and can be curated by the single user or user(s) of the single ecosystem). Moreover, in various implementations one or more rules can be supplemented or replaced by one or more trained machine learning models.

Turning now to FIG. 2A2, a user in the home provides a spoken utterance of "Let me see" immediately following the rendering of the client device notifications of FIG. 2A1. The client device $106_1$ can detect the spoken utterance and transmit corresponding data to the remote automated assistant component(s) 119. The transmitted corresponding data can be audio data or a semantic representation of the audio data, such as a text representation based on local speech-to-text processing performed by the client device $106_1$. In some implementations, the client device $106_1$ can automatically monitor (e.g., automatically perform speech capture) for the spoken utterance in response to rendering at least part of the client device notification, thereby obviating the need for the user to explicitly invoke the client device $106_1$ through a "hot word" or via other means.

The remote automated assistant component(s) 119 can process the data transmitted by the client device $106_1$ and perform one or more assistant action(s) based on processing of the data. For example, where the data is audio data the STT component 117 can be used to generate text, and the natural language processor 122 can process the generated text in determining the assistant action(s) to perform. Further, based on the spoken utterance being detected during the automatic monitoring for the voice input, the natural language processor 122 and/or other components can utilize the client device notification (and/or the IoT state change notification on which it was based) in determining the assistant action(s) to perform). For instance, the natural language processor 122 can determine the spoken utterance "let me see" references the doorbell IoT device $145_1$ and, as a result, determine the spoken utterance is a request to see a live video feed from a camera of the doorbell IoT device $145_1$. The remote automated assistant component(s) 119 can then generate an IoT device command that, if transmitted, will enable provision of a live video feed from the camera.

Figure 2B:
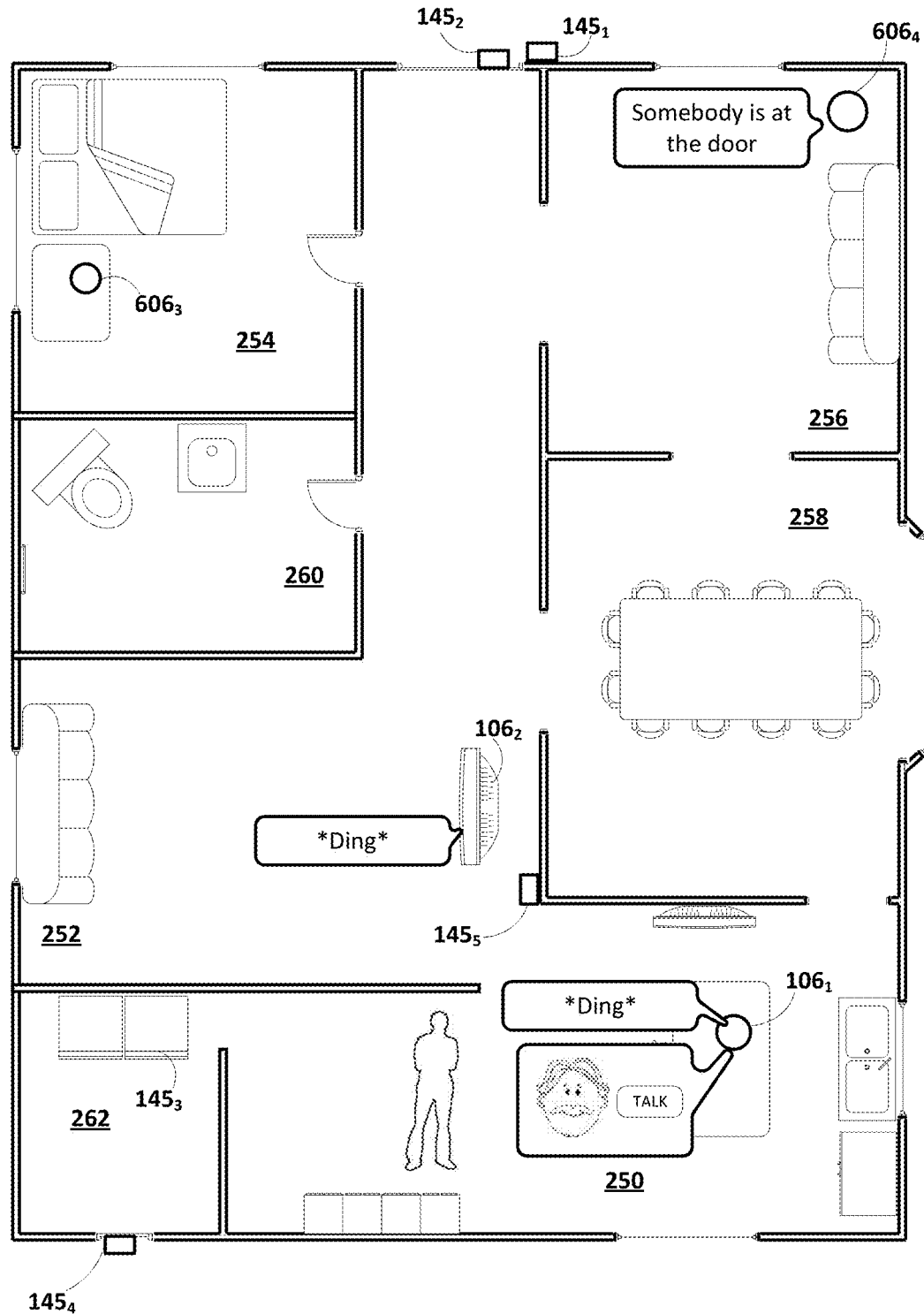
Figure 3:
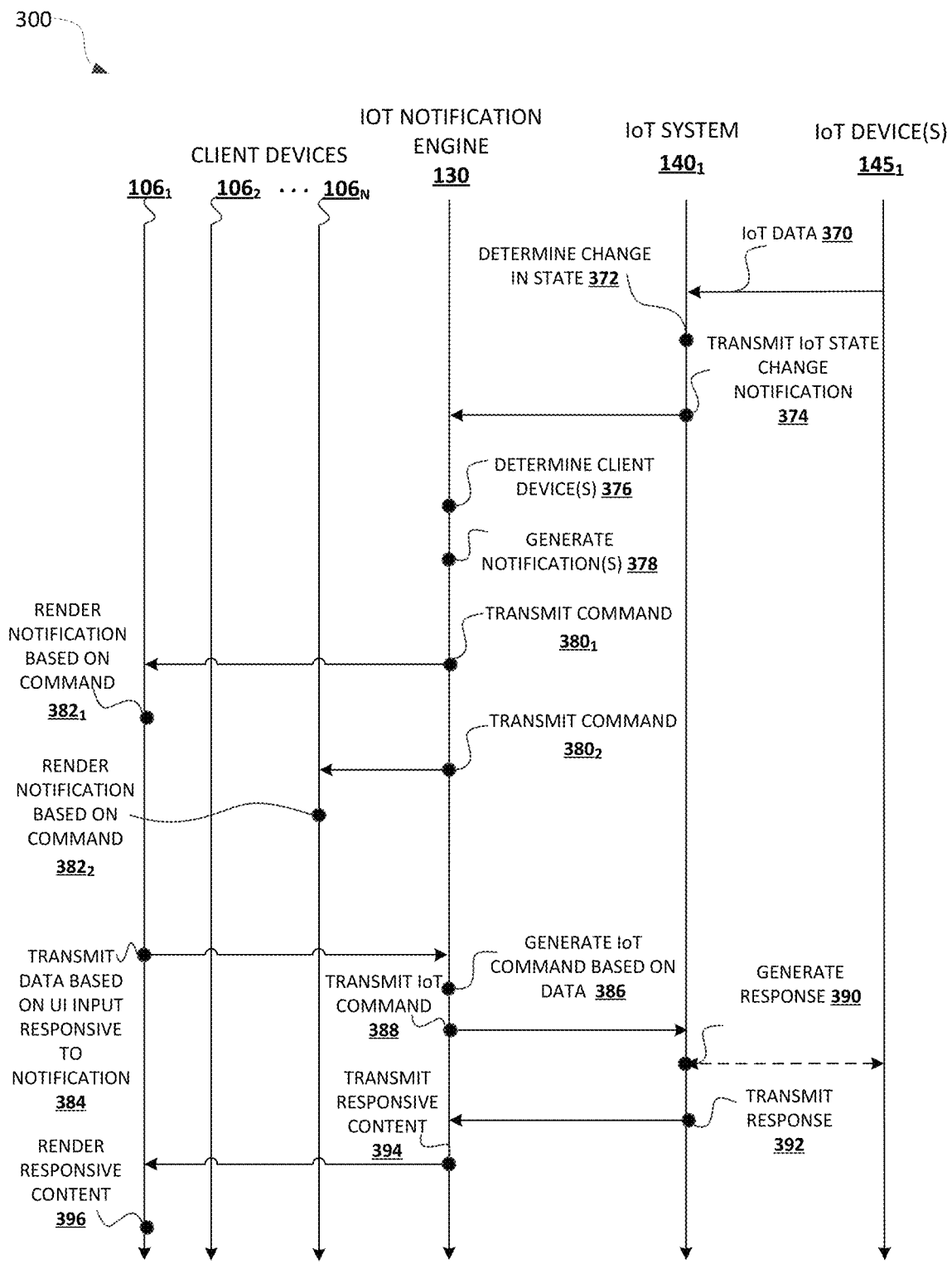

FIG. 2A3 illustrates the client device $106_1$ providing a live video feed from the camera of the doorbell IoT device $145_1$, as a result of the remote automated assistant component(s) 119 transmitting such an IoT device command. The live video feed can be transmitted to the client device $106_1$ via the remote automated assistant component(s) 119, or directly.

Figure 4:
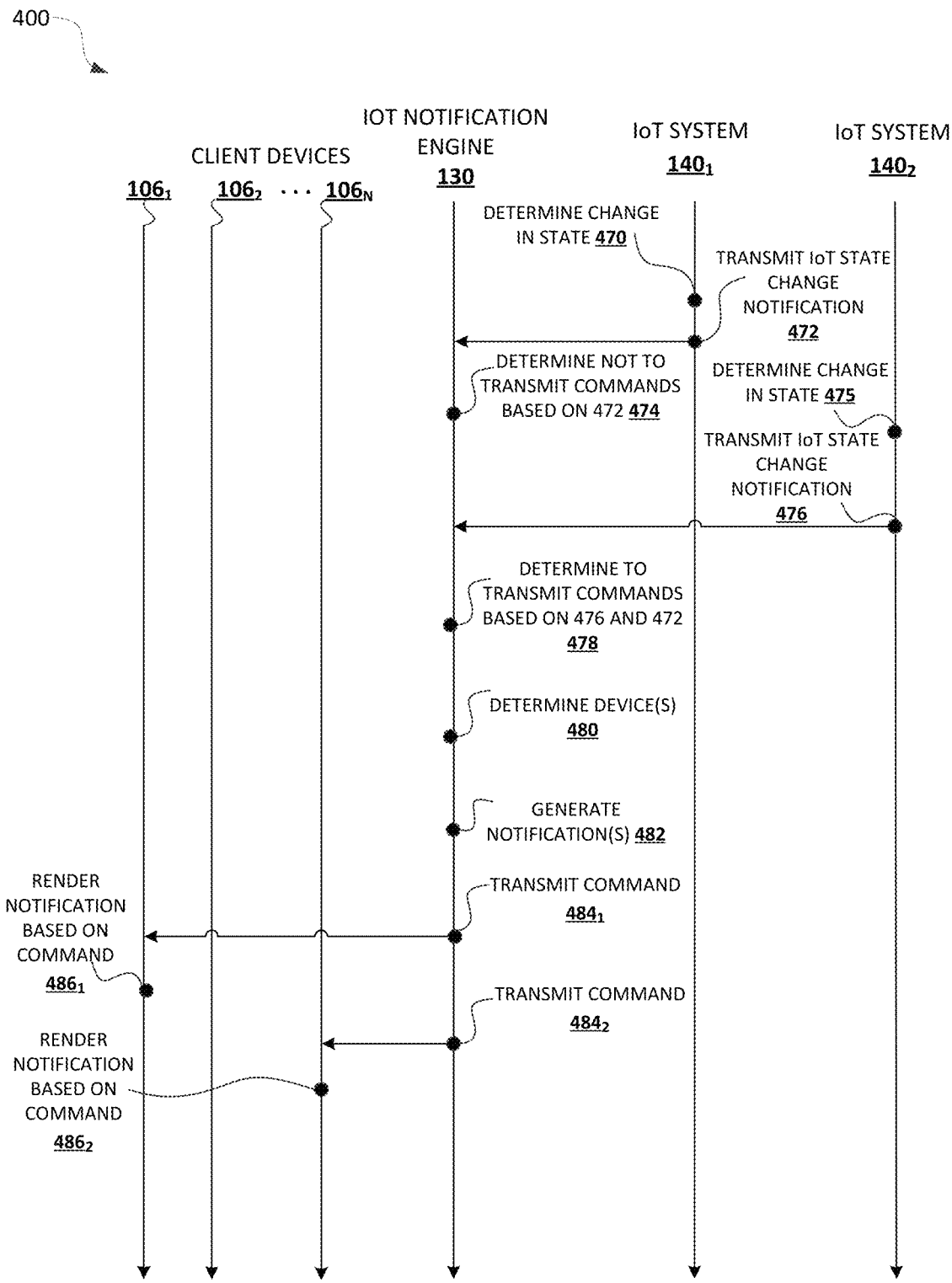

FIG. 2A4 illustrates an alternative to FIG. 2A3 and is an example where the client device $106_1$ does not have display capabilities. As a result of the client device $106_1$ not having display capabilities, the live video feed is instead provided via the client device $106_2$ and the client device $106_1$ provide an audible response indicating that the live video feed is being presented via the client device $106_2$. For example, one or more of the remote automated assistant component(s) 119 can determine the live video feed requires display capabilities, and further determine client device $106_1$ lacks display capabilities based on, for example, device attributes for client device $106_1$ in a device topology representation. Further, one or more of the remote automated assistant component(s) 119 can utilize the device topology representation to determine client device $106_2$ has display capabilities and, as a result, cause the live video feed to be provided via the client device $106_2$.

In FIG. 2A1 the client devices $106_1$, $106_2$, and $106_4$ are all illustrated as rendering the same audible client device notification of "Somebody is at the door" via respective speaker(s). However, in some implementations and/or situations different client device notifications, for the same IoT state change notification, can be provided at different client devices. FIG. 2B illustrates one such situation. In particular, FIG. 2B illustrates alternative notifications that could be provided for the same IoT state change notification of FIG. 2A1.

In FIG. 2B, client device $106_4$ provides the same audible client device notification as it does in FIG. 2A1. However, the client devices $106_1$ and $106_2$ provide different client device notifications relative to FIG. 2A1, and different client device notifications relative to each other in FIG. 2B. In particular, client device $106_2$ renders only a "ding" sound as a client device notification. In some implementations, only the "ding" sound is provided, and not the longer duration "somebody is at the door" and/or not any visual notification", based on a current state of the client device $106_2$. For example, the less obtrusive "ding" sound can be provided as a result of the client device $106_2$ being in a state in which it is already rendering audiovisual content (e.g., it's being utilized to watch a movie). In some implementations, the less obtrusive sound can be provided based on the IoT notification engine 130 determining the current state of the client device $106_2$ and tailoring the command provided to the client device $106_2$ based on the current state. In other implementations, the command provided to the client device $106_2$, can offer client device $106_2$ flexibility with respect to how to render a client device notification and/or which of multiple client device notifications to provide, and the client device $106_2$ can itself determine to provide the less obtrusive sound.

In FIG. 2B, the client device $106_1$ renders, as a client device notification, both a "ding" sound and an interactive graphical interface. The interactive graphical interface includes an image, captured by a camera of the doorbell IoT device $145_1$, of an individual at the front door. The interactive graphical interface further includes an interactive "talk" button that can be selected by the user. Selection of the "talk" button can cause an IoT command to be generated that establishes "intercom" type communication via microphone(s) and speaker(s) of the client device $106_1$ and microphone(s) and speaker(s) of the doorbell IoT device $145_1$—enabling the user to communicate with the individual at the door. In some implementations, the more robust client device notification is provided at the client device $106_1$ based on a current state of the client device $106_1$, based on detected proximity of the user to the client device $106_1$, based on output capabilities of the client device $106_1$, and/or other factors. For instance, the more robust notification can be provided based on detecting the user is proximal to the client device $106_1$ and based on output capabilities of the client device $106_1$. In some implementations, the more robust notification can be provided based on the IoT notification engine 130 considering such factor(s) and tailoring the command provided to the client device $106_1$ based on such factors. In other implementations, the command provided to the client device $106_1$, can offer client device $106_1$ flexibility with respect to how to render a client device notification and/or which of multiple client device notifications to provide, and the client device $106_1$ can itself determine to provide the more robust notification.

Figure 2C:
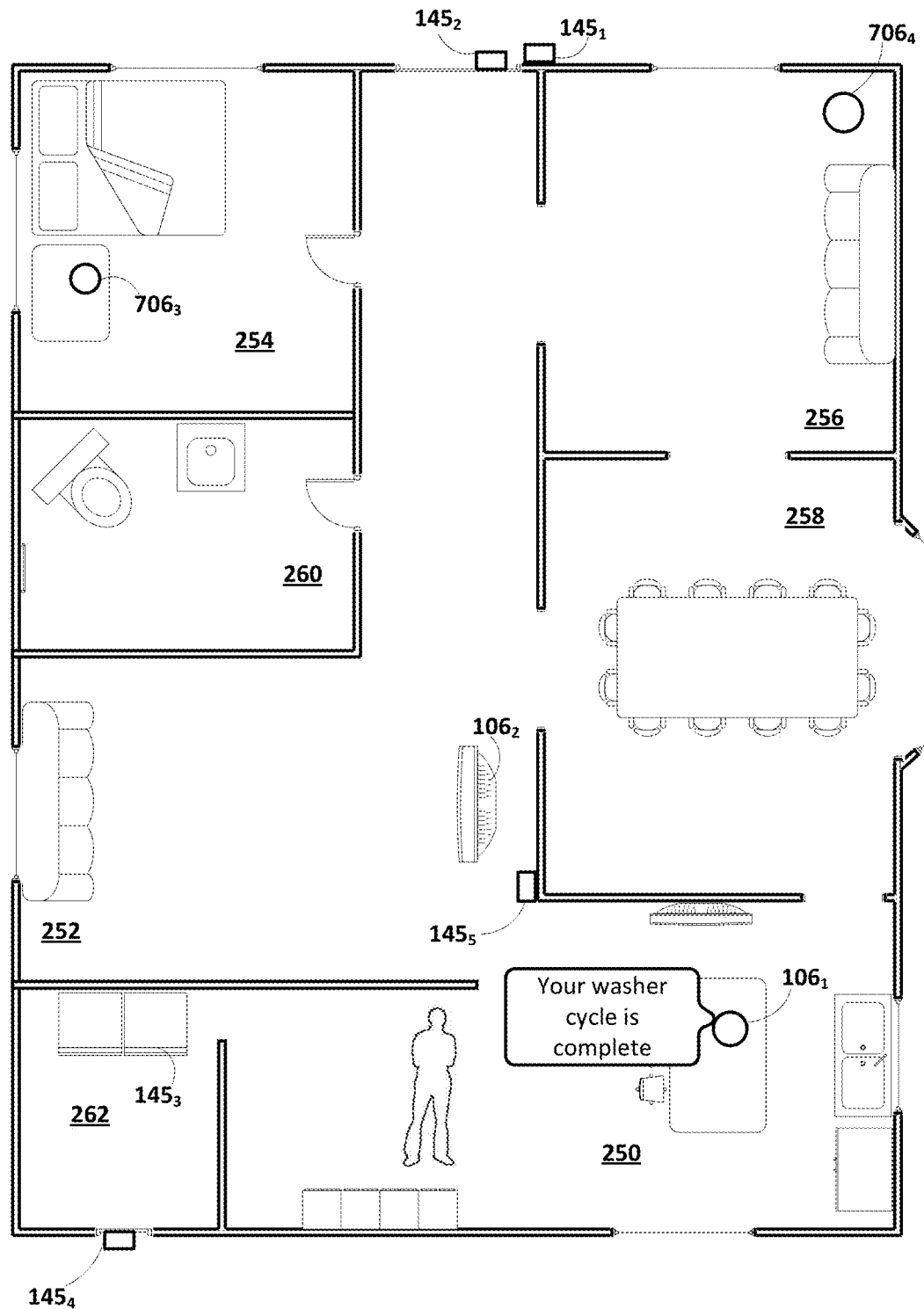

FIG. 2C illustrates only client device $106_1$ rendering an audible client device notification of "Your washer cycle is complete" via its speaker(s). The client devices $106_1$ can each provide the audible notification in response to a received command transmitted by cloud-based automated assistant component(s) 119. The IoT notification engine 130 can generate the client device notification and cause the command to be transmitted in response to receiving a corresponding IoT state notification from one of the IoT systems 140. For example, one of the IoT systems 140 can provide an IoT state notification that indicates the clothes washer IoT device $145_3$ has completed a cycle. The IoT state notification can be generated and provided by the one of the IoT systems in response to receiving corresponding data from the clothes washer IoT device $145_3$.

The IoT notification engine 130 can determine, in FIG. 2C, to only cause rendering of the client device notification at the client device $106_1$. As one example, manually created and/or automatically determined rules stored in user information database 135 can dictate that a "cycle complete" notification, or more generally any notification from clothes washer IoT device $145_3$, should only be provided at a client device that is currently most proximal to a user (any user or a particular user), and/or such a notification should only be provided via a single client device and only when it is determined a user is present in the home. By limiting the client devices which the notification is provided at and/or the times at which it is provided, the resources of the client device $106_1$ may be conserved. Furthermore, as the IoT notification engine 130 does not cause rendering of the client device notification, the resources of the cloud-based automated assistant component(s) 119 may also be conserved. Network resources which would otherwise be used to communicate from the cloud-based automated assistant component(s) 119 to the client device $106_1$ to cause the rendering may also be conserved. Various techniques can be utilized to determine client device(s) that are proximal to a user, such as those described herein in conjunction with presence sensor 105.

Figure 2D:
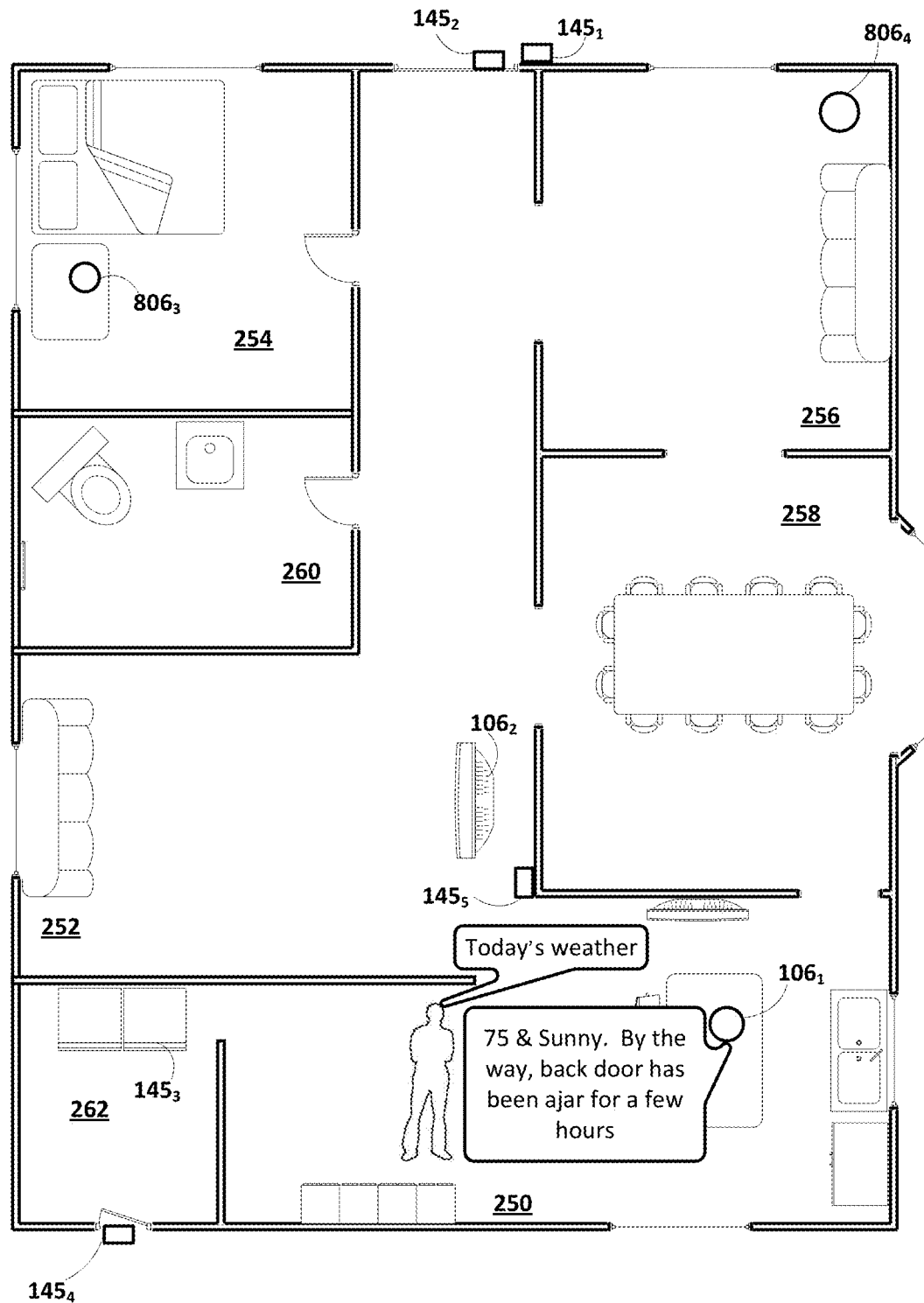

FIG. 2D illustrates an example where client device $106_1$ renders an audible client device notification of "By the way, back door has been ajar for a few hours" via its speaker(s), but only after first receiving an unrelated spoken utterance from the user ("today's weather") and rendering responsive content to the unrelated spoken utterance ("75 and Sunny"). The rendering of the audible client device notification in FIG. 2D is still "automatic" in that it is rendered independent of any user interface input that explicitly requests rendering of any notifications (e.g., independent of a spoken utterance such as "what are my notifications"). However, the rendering of the audible client device notification in FIG. 2D is not immediate, and is contingent on provisioning of separate unrelated output to the user in response to a separate unrelated input of the user. As the rendering of the audible client device notification is contingent on the provision of a separate unrelated output, the audible client device may be prevented from rendering audible client device notifications at times which are distracting to the user, or otherwise undesirable.

In some implementations, the IoT notification engine 130 can provide a command to the client device $106_1$ that causes the client device $106_1$ to render "By the way, back door has been ajar for a few hours" following "75 and Sunny". The command can be provided in combination with data provided for provisioning of "75 and Sunny", or can be provided preemptively to the client device $106_1$. When preemptively provided, the client device $106_1$ can store the client device notification locally and append it automatically to any "next" output provided by the client device.

The IoT notification engine 130 can generate the client device notification of FIG. 2D in response to receiving a corresponding IoT state notification from one of the IoT systems 140. For example, one of the IoT systems 140 can provide an IoT state notification that indicates the door open/close sensor IoT device $145_4$ indicates the back door is open. The IoT state notification can be generated and provided by the one of the IoT systems in response to receiving corresponding data from the open/close sensor IoT device $145_4$. In some implementations, the IoT notification engine 130 only causes the client device notification to be rendered in response to determining the IoT state notification indicating the back door is open, and one or more additional conditions being satisfied. The additional condition(s) can include, for example, that it has been at least a threshold amount of time (e.g., at least an hour) and no subsequent IoT state notification has been received indicating the back door is now closed. Accordingly, in such an example, the IoT notification engine 130 will not cause any corresponding client device notifications to be rendered if it has not been at least the threshold amount of time. Further, in some implementations, the IoT notification engine 130 can cause an immediate client device notification to be rendered if one or more additional conditions are satisfied (e.g., the door continuing to be open well beyond the threshold amount of time). More generally, the IoT notification engine 130 can dynamically adapt an importance measure for a IoT state notification based on changing conditions, and dynamically adapt how and/or when client device notifications are automatically provided based on the adaptive importance measure.

FIG. 3 illustrates an example state diagram 300 in accordance with various implementations. In FIG. 3, IoT data 370 transmitted from IoT device(s) $145_1$ is received by IoT system $140_1$. At 372, the IoT system $140_1$ determines a change in state based on the IoT data 370. As one example, where IoT device(s) $145_1$ include a camera and IoT data 370 includes images and/or a video feed from the camera, the determined change of state can be detected presence of a person (or a particular person) based on analysis of the IoT data 370 by the IoT system $140_1$. As another example, where IoT device(s) $145_1$ include an appliance, and the IoT data 370 indicates an error condition of the appliance, the determined change of state can be the error condition.

At 374, the IoT system $140_1$ transmits an IoT state change notification to the IoT notification engine 130. The IoT state change notification can be structured data that includes, for example, a state indication that indicates the change in the state associated with the at least one IoT device, a unique identifier that identification of client device(s) associated with the at least one IoT device, and optionally an indication of the at least one IoT device. In some implementations, at 374 the IoT system $140_1$ transmits the IoT state change notification to the IoT notification engine 130 using an application programming interface (API) of an automated assistant associated with the IoT notification engine 130.

At 376, the IoT notification engine 130 determines one or more client devices that are associated with the IoT state change notification and that should be caused to render notifications corresponding to the IoT state change notification. As described herein, client devices that are associated with the IoT state change notification can be identified based on a unique identifier included in the IoT state change notification. In some implementations, the IoT notification engine 130 determines that all client devices that are associated with the IoT state change notification should be caused to render notifications corresponding to the IoT state change notification. However, in other implementations the IoT notification engine 130 determines a subset of the client devices that should be caused to render notifications corresponding to the IoT state change notification. For example, in FIG. 3 the IoT notification engine 130 determines only client devices $106_1$ and $106_N$ should be caused to render notifications corresponding to the IoT state change notification. In some of those implementations, the IoT notification engine 130 determines the subset based on properties of the received IoT state change notification, current properties associated with the client device(s), time of day, day of the week, and/or one or more other criteria.

At 378, the IoT notification engine 130 generates one or more notifications 378 for the determined client devices. In some implementations, a single notification can be generated for all of the client devices. In some other implementations, multiple notifications are generated. In some of those other implementations, the notification for a given device can be generated based a current state of the given device, based on detected proximity of user(s) to the given device, based on output capabilities of the given device, and/or other factors.

At $380_1$ the IoT notification engine 130 transmits a command to client device $106_1$. The command causes the client device $106_1$ to automatically and immediately render one of the one or more notifications. Such rendering is indicated at $382_1$. At $380_2$ the IoT notification engine 130 transmits a command to client device $106_N$. The command causes the client device $106_N$ to automatically and immediately render one of the one or more notifications. Such rendering is indicated at $382_2$. It is noted that in some implementations $380_1$ and $380_2$ can occur concurrently or substantially concurrently (e.g., within one second of one another, within a half second of one another, or within a tenth of a second of one another). It is also noted concurrently (e.g., within one second of one another, within a half second of one another, or within a tenth of a second of one another).

At 384, the client device $106_1$ transmits data based on user interface input that is responsive to the notification rendered by the client device $106_1$ at $382_1$. In some implementations, the user interface input can be a spoken utterance detected via microphones(s) of the client device $106_1$, and the data could include audio data that captures the spoken utterance and/or a textual conversion of the audio data. In some of those implementations, the spoken utterance is detected based on automatically monitoring for spoken utterances for a period of time after the client device notification is at least partially rendered.

At 386, the IoT notification component 130 (and/or other remote automated assistant component(s)) generates an IoT command based on the data transmitted at 384. For example, the IoT command can be generated based on text generated from performing a speech-to-text conversion of the spoken utterance, and based on value(s) inferred based on the spoken utterance being responsive to the notification rendered by the client device $106_1$ at $382_1$. The inferred value(s) can be based on the client device notification and/or the IoT state change notification on which the client device notification was based.

At 388, the IoT notification component 130 (and/or other remote automated assistant component(s)) transmits the IoT command to the IoT system $140_1$.

At 390, the IoT system $140_1$ generates a response to the IoT command, which could involve interfacing with the IoT device $145_1$ as indicated by the dashed horizontal line. Various responses can be generated. For example, if the IoT device $145_1$ is a smart lock and the IoT command is a command to unlock the smart lock, the response can be a confirmation that the smart lock is unlocked. As another example, if the IoT device $145_1$ includes a camera and the IoT command is a command to provide a feed from the camera, the response can be the feed or instructions to establish the feed.

At 392, the IoT system $140_1$ transmits the response to the IoT notification component 130 (and/or other remote automated assistant component(s)).

At 394, the IoT notification component 130 (and/or other remote automated assistant component(s)) transmits responsive content 394 that is based on the response and, at 396 the client device $106_1$ renders the responsive content.

FIG. 4 illustrates another example state diagram 400 in accordance with various implementations. In FIG. 4, at 470, IoT system $140_1$ determines a change in state based on data provided by one or more IoT device(s) $145_1$ (not illustrated in FIG. 4). As a working example, the one or more IoT device(s) $145_1$ can include a smart door lock, and the change in state can be a change of the door lock to unlocked.

At 472, the IoT system $140_1$ transmits an IoT state change notification to the IoT notification engine 130. The IoT state change notification of 472 corresponds to the determined change in state at 470. Continuing with the working example, the IoT state change notification can be structured data that includes, for example, an indication of the smart door lock, a state indication that indicates the change to unlocked, and a unique identifier that enables identification of client device(s) associated with the smart door lock.

At 474, the IoT notification engine 130 determines, based on the IoT state change notification of 472, not to transmit any commands that would cause a client device to render a notification based on the IoT state change notification. For example, the IoT notification engine 130 can determine that, standing alone, the IoT state change notification of 472 is of a low priority and does not warrant provisioning of any corresponding client device notifications.

At a later time, at 475, a separate IoT system $140_2$ (e.g., controlled by a different third-party than that which controls IoT system $140_1$) determines a change in state based on data provided by one or more IoT device(s) $145_2$ (not illustrated in FIG. 4). Continuing with the working example, the one or more IoT device(s) $145_2$ can include presence sensors near the smart door lock, and the change in state can be a change from detecting presence, to no longer detecting presence.

At 476, the IoT system $140_2$ transmits an IoT state change notification to the IoT notification engine 130. The IoT state change notification of 476 corresponds to the determined change in state at 475. Continuing with the working example, the IoT state change notification can be structured data that includes, for example, an indication of the presence sensor, a state indication that indicates the change to no longer detecting presence, and a unique identifier that enables identification of client device(s) associated with the presence sensor.

At 478, the IoT notification engine 130 determines, based on both the IoT state change notification of 472 and the IoT state change notification of 476, to transmit commands that would cause client devices to render a combined notification that is based on both the IoT state change notification of 472 and the IoT state change notification of 476. For example, and continuing with the working example, the IoT notification engine 130 can determine, using a device topology representation, that the presence sensors and the smart door lock are in the same room. Further, the IoT notification engine 130 can determine that the combination of the smart door lock being unlocked, and the presence sensors indicating lack of presence, warrants provision of corresponding notifications.

At 480, the IoT notification engine 130 determines one or more client devices that are associated with the IoT state change notifications of 472 and 476, and that should be caused to render notifications corresponding to the IoT state change notification.

At 482, the IoT notification engine 130 generates one or more notifications for the determined client devices.

At $484_1$ the IoT notification engine 130 transmits a command to client device $106_1$. The command causes the client device $106_1$ to automatically and immediately render one of the one or more notifications. Such rendering is indicated at $486_1$. At $484_2$ the IoT notification engine 130 transmits a command to client device $106_N$. The command causes the client device $106_N$ to automatically and immediately render one of the one or more notifications. Such rendering is indicated at $386_2$. It is noted that in some implementations $484_1$ and $484_2$ can occur concurrently or substantially concurrently and/or $486_1$ and $486_2$ can occur concurrently or substantially concurrently.

Figure 5:
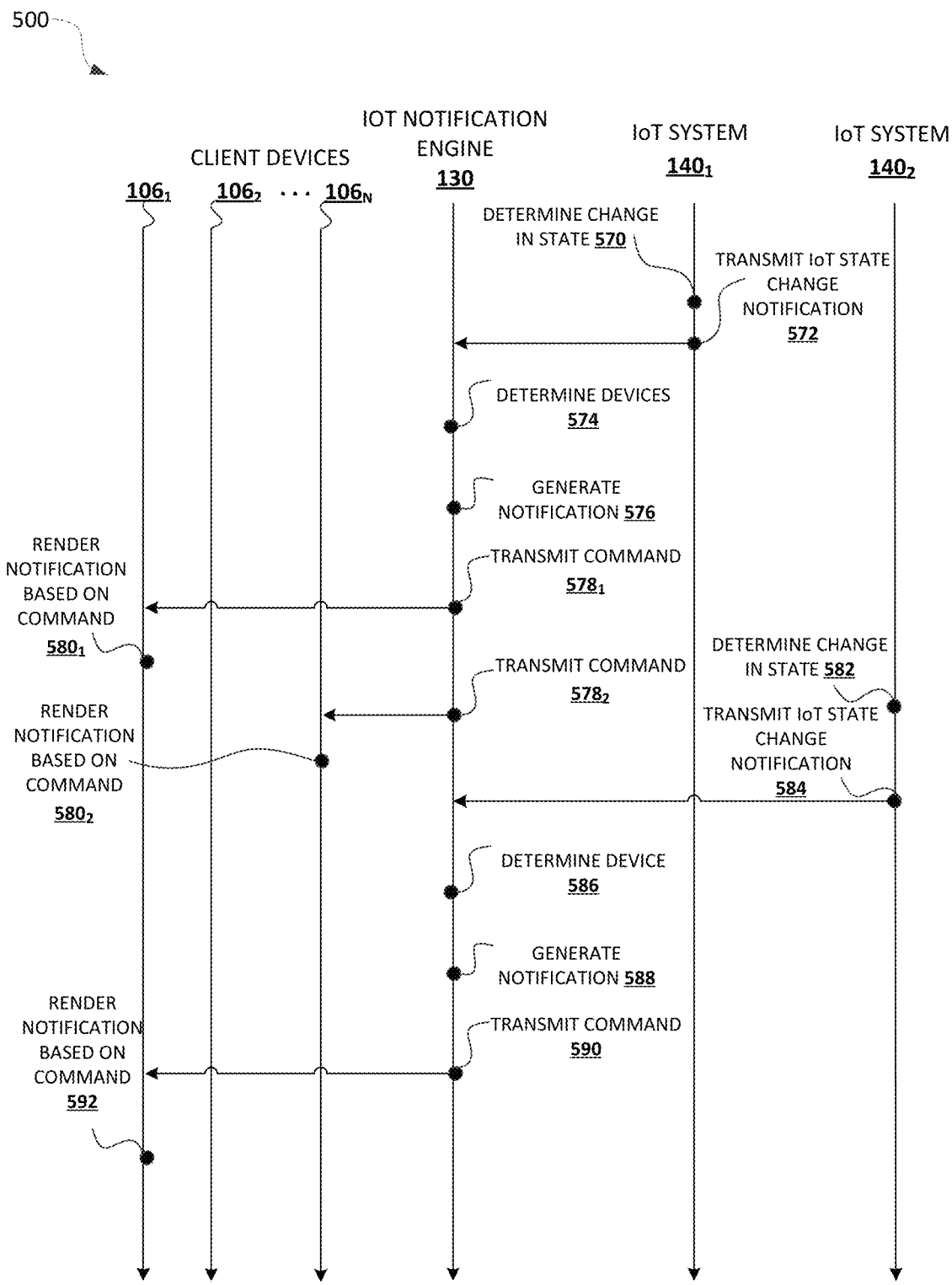
FIG. 5 illustrates yet another example state diagram in accordance with various implementations.

FIG. 5 illustrates yet another example state diagram 500 in accordance with various implementations.

In FIG. 5, IoT system $140_1$ determines a change in state at 570 and transmits a corresponding IoT state change notification at 572.

At 574, the IoT notification engine 130 determines that two client devices $106_1$ and $106_N$, of multiple candidate client devices $106_{1-N}$, should be caused to render a notification corresponding to the IoT state change notification of 572.

At 576, the IoT notification engine 130 generates a notification for the determined client devices $106_1$ and $106_N$.

At $578_1$ the IoT notification engine 130 transmits a command to client device $106_1$. The command causes the client device $106_1$ to automatically and immediately render the notification. Such rendering is indicated at $580_1$. At $578_2$ the IoT notification engine 130 transmits a command to client device $106_N$. The command causes the client device $106_N$ to automatically and immediately render the notification. Such rendering is indicated at $580_2$.

At 582, IoT system $140_1$ determines a change in state and transmits a corresponding IoT state change notification at 584.

At 586, the IoT notification engine 130 determines that only one client devices $106_1$, of multiple candidate client devices $106_{1-N}$, should be caused to render a notification corresponding to the IoT state change notification of 572. It is noted that only one client device is determined at 586, whereas two were determined at 574. This difference can be based on various factors such as different properties of the two received IoT state change notifications, differing properties associated with the client device(s) at the time the determinations were made, times of day at the time the determinations were made, days of the week at the time the determinations were made, etc.

At 588, the IoT notification engine 130 generates a notification for the determined client device $106_1$.

At 590 the IoT notification engine 130 transmits a command to client device 106₁. The command causes the client device 106₁ to automatically and immediately render the notification. Such rendering is indicated at 592.

Figure 6:
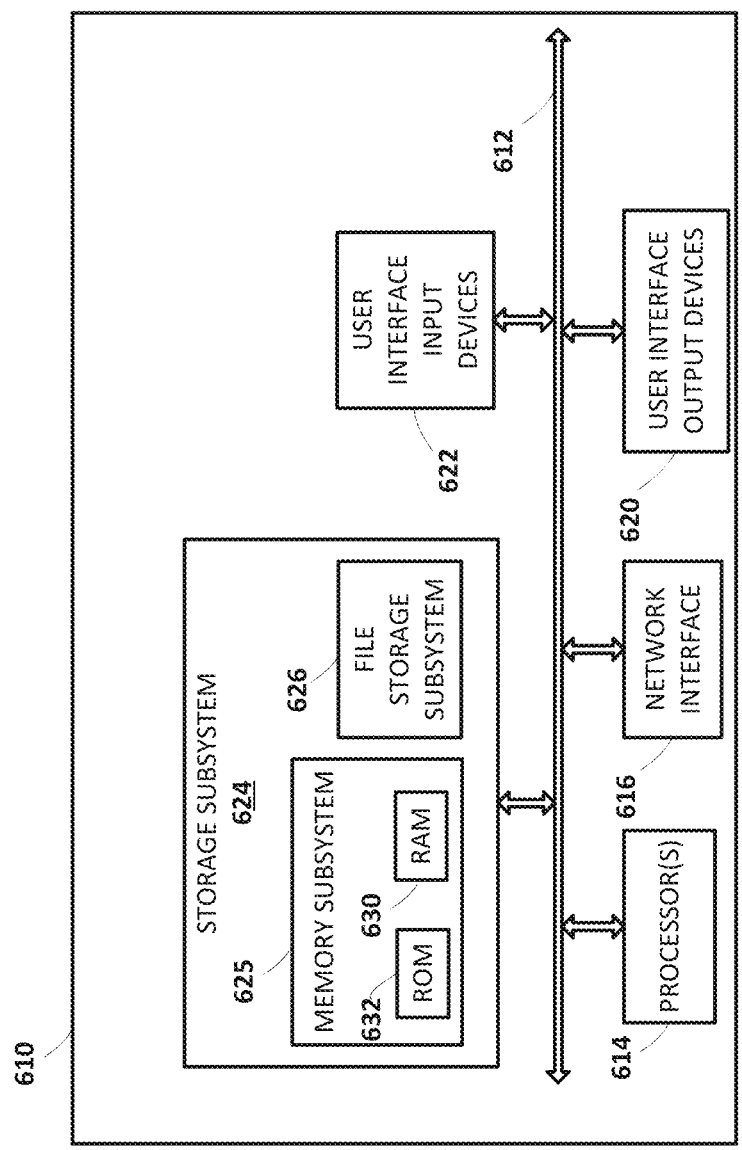
FIG. 6 illustrates an example architecture of a computing device.

FIG. 6 is a block diagram of an example computing device 610 that may optionally be utilized to perform one or more aspects of techniques described herein. In some implementations, one or more of a client computing device, IoT notification engine 130, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method is provided that includes receiving, via one or more network interfaces of an automated assistant computing system, an Internet of things (IoT) state change notification. The IoT state change notification is transmitted to the automated assistant computing system in response to determining a change in a state associated with at least one IoT device. The IoT state change notification includes: a unique identifier, an indication of the at least one IoT device, and a state indication that indicates the change in the state associated with the at least one IoT device. The method further includes identifying, by the automated assistant computing system based on the unique identifier, a plurality of candidate assistant client devices that are each associated with the unique identifier and that each have a corresponding automated assistant client. The method further includes generating, by the automated assistant computing system based on the indication of the at least one IoT device and based on the state indication, a client device notification for at least one client device of the plurality of candidate assistant client devices. The method further includes transmitting, to the one client device, a command that causes the automated assistant client of the one client device to: automatically render the generated client device notification via at least one user interface output device of the one client device. For example, the command can cause the client device to automatically render the generated client device notification independent of any user interface input that explicitly requests rendering of any notifications. The command can further cause the automated assistant client of the one client device to: automatically monitor for voice input for a period of time after the client device notification has been at least partially rendered, and transmit data corresponding to a spoken utterance based on the spoken utterance being detected during the automatic monitoring for the voice input.

These and other implementations of the technology disclosed herein can include one or more of the following features.

In some implementations, the method further includes: receiving, from the one client device, the data corresponding to the spoken utterance; generating an IoT device command based on the data corresponding to the spoken utterance, and based on the spoken utterance being detected during the automatic monitoring for the voice input; and transmitting the IoT device command. Transmitting the IoT device command causes alteration of the state, or of an additional state, of the at least one IoT device. In some versions of those implementations, generating the IoT device command based on the data corresponding to the spoken utterance, and based on the spoken utterance being detected during the automatic monitoring for the voice input includes: generating at least one value for the IoT device command based on the data corresponding to the spoken utterance; and inferring at least one additional value for the IoT device command based on the spoken utterance being detected during the automatic monitoring for the voice input. Inferring the at least one additional value can be based on the client device notification and/or the IoT state change notification based on which the client device notification is generated. For example, inferring the at least one additional value based on the IoT state change notification can include inferring an identifier of the at least one IoT device based on the IoT state change notification or the client device notification.

In some implementations, the method further includes: receiving, from the one client device, the data corresponding to the spoken utterance; generating responsive content for the spoken utterance based on the data corresponding to the spoken utterance, and based on the spoken utterance being detected during the automatic monitoring for the voice input; and transmitting the responsive content to the one client device to cause the one client device to render responsive output that is based on the responsive content. In some of those implementations, generating the responsive content based on the data corresponding to the spoken utterance, and based on the spoken utterance being detected during the automatic monitoring for the voice input includes: generating at least one value based on the data corresponding to the spoken utterance; and inferring at least one additional value based on the spoken utterance being detected during the automatic monitoring for the voice input. Inferring the at least one additional value can be based on the client device notification and/or the IoT state change notification based on which the client device notification is generated. Generating the responsive content can be based on the at least one value and the at least one additional value.

In some implementations, the client device notification includes text. In some version of those implementations, the command includes the text of the client device notification and the command causes the automated assistant client of the selected one client device to automatically render the generated client device notification via the at least one user interface output device of the one client device by causing the one client device to convert the text into audio data and render the audio data via at least one speaker of the once client device.

In some implementations, the method further includes determining to transmit the command to the one client device based on the indication of the at least one IoT device in the IoT state change notification and/or the state indication in the state change notification. In some implementations, the method further includes determining to transmit the command to the one client device based additionally or alternatively on a current time of the day and/or a current day of the week. In some implementations, the method further includes determining to transmit the command to the one client device based additionally or alternatively on determining that at least one user is proximal to the one client device and/or determining that the one client device is not in one or more predefined states. In some version of those implementations, determining that the user is proximal to the one client device is based on: recency of user interaction with the one client device, client device sensor data from at least one sensor of the one client device, and/or additional sensor data from at least one sensor that is not a sensor of the one client device, but is proximal to the one client device.

In some implementations, the method further includes: selecting a group of multiple of the candidate client devices, including the one client device; transmitting the command to the one client device based on the one client device being included in the selected group; and transmitting a respective command to each of the other candidate client devices of the selected group based on the other candidate client devices being included in the selected group. The respective commands each cause a respective one of the other candidate client devices to render a respective client device notification generated based on the indication of the at least one IoT device and based on the state indication. In some versions of those implementations, the respective commands are each the same as the command and the respective client device notifications are each the same as the client device notification. In some other versions of those implementations, at least one of the respective commands differs from the command and at least one of the respective client device notifications differs from the client device notification. In some implementations, selecting the group of multiple of the candidate client devices includes excluding a given client device, of the candidate client devices from the group, based on: determining that the given client device is in one or more predefined states; the indication of the at least one IoT device in the IoT state change notification; and/or the state indication in the IoT state change notification.

In some implementations, a method is provided that includes receiving, via one or more network interfaces of an automated assistant computing system: a first IoT state notification from a first third-party system, and a second IoT state notification from a second third-party system. The first IoT state notification is transmitted to the automated assistant computing system and indicates a first state associated with a first group of one or more IoT devices. The first IoT state notification includes a unique identifier and a first state indication that indicates the first state associated with the first group of one or more IoT devices. The second IoT state notification is transmitted to the automated assistant computing system and indicates a second state associated with a second group of one or more IoT devices. The second IoT state notification includes the unique identifier or an additional unique identifier, and a second state indication that indicates the second state associated with the second group of one or more IoT devices. The method further includes determining to transmit a combined notification that is based on both the first IoT state notification and the second IoT state notification. Determining to transmit the combined notification is based on determining, based on the first IoT state notification and the second IoT state notification, that the first state and the second state are co-occurring. The method further includes identifying, by the automated assistant computing system based at least in part on the unique identifier, a plurality of candidate assistant client devices that each have a corresponding automated assistant client and that are each associated with both the first group of one or more IoT devices and the second group of one or more IoT devices. The method further includes selecting at least one of the candidate assistant client devices, and transmitting a command to the selected at least one of the candidate assistant client devices. The command includes the combined notification and causes the automated assistant client of the at least one of the candidate assistant client devices to: automatically render the combined notification via at least one user interface output device of the at least one of the candidate assistant client devices.

These and other implementations of the technology disclosed herein can include one or more of the following features.

In some implementations the combined notification includes a prompt and the command further causes the automated assistant client to monitor for a response to the prompt and transmit the response to the prompt. In some versions of those implementations, the prompt recommends a change to the first state associated with the first group of one or more IoT devices. In some of those versions, the method further includes: in response to receiving an affirmative response to prompt: transmitting an IoT command that causes the change to the first state associated with the first group of one or more IoT devices. In some additional or alternative versions of those implementations, the combined notification includes a graphical interface and the prompt is a selectable element of the graphical interface. In such additional or alternative versions, the affirmative response to the prompt can be a selection of the selectable element of the graphical interface.

In some implementations, the first IoT state notification is received at a first time and the second IoT state notification is received at a second time that is after the first time. In some of those implementations, the method further includes determining, after the first time and prior to the second time, to not transmit any commands that cause rendering of any notifications that are based on the first IoT state notification.

In some implementations, a method is provided that includes receiving, via one or more network interfaces of an automated assistant computing system, an IoT state change notification. The IoT state change notification is transmitted to the automated assistant computing system in response to determining a change in a state associated with at least one IoT device. The IoT state change notification includes a unique identifier, an indication of the at least one IoT device, and a state indication that indicates the change in the state associated with the at least one IoT device. The method further includes identifying, by the automated assistant computing system based on the unique identifier, a plurality of assistant client devices that are each associated with the unique identifier and that each have a corresponding automated assistant client. The method further includes selecting a subset of the assistant client devices based at least in part on the indication of the at least one IoT device and/or the state indication that indicates the change in the state associated with the at least one IoT device. The method further includes transmitting, to only each of the assistant client devices of the selected subset, a corresponding command that causes the automated assistant client of the assistant client device to: automatically render a corresponding notification that is tailored to the IoT state change notification.

In some implementations, a method is provided that includes receiving, via one or more network interfaces of an automated assistant computing system at a first time: a first IoT state change notification from a first third-party system. The first IoT state change notification is transmitted to the automated assistant computing system and indicates a change to a first state associated with a first group of one or more IoT devices. The first IoT state change notification includes: a unique identifier, an indication of the first group of one or more IoT devices, and a first state indication that indicates the first state associated with the first group of one or more IoT devices. The method further includes identifying, by the automated assistant computing system based on the unique identifier, a plurality of candidate assistant client devices that are each associated with the unique identifier and that each have a corresponding automated assistant client. The method further includes selecting a first subset of the candidate assistant client devices. Selecting the first subset is based at least in part on the indication of the first group of one or more IoT devices and/or the first state indication that indicates the first state associated with the first group of one or more IoT devices. The method further includes transmitting a corresponding command to only each of the candidate assistant client devices of the first subset. The corresponding command(s) each cause the automated assistant client of a corresponding one of the candidate assistant client device(s) of the first group to automatically render a corresponding notification that is tailored to the first IoT state change notification. The method further includes receiving, via one or more network interfaces of an automated assistant computing system at a second time: a second IoT state change notification from a second third-party system. The second IoT state change notification is transmitted to the automated assistant computing system and indicates a change to a second state associated with a second group of one or more IoT device. The second IoT state change notification includes the unique identifier or an additional unique identifier, an indication of the second group of one or more IoT devices, and a second state indication that indicates the second state associated with the second group of one or more IoT devices. The method further includes identifying, by the automated assistant computing system based on the unique identifier or the additional unique identifier, the plurality of candidate assistant client devices. The method further includes selecting a second subset, of the candidate assistant client devices, where the second subset varies from the first subset. Selecting the second subset is based at least in part on the indication of the second group of one or more IoT devices and/or the second state indication that indicates the second state associated with the second group of one or more IoT devices. The method further includes transmitting a corresponding second command to only each of the candidate assistant client devices of the second subset. The corresponding second command(s) each cause the automated assistant client of a corresponding one of the candidate assistant client device(s) of the second group to: automatically render a corresponding second notification that is tailored to the second IoT state change notification.

In some implementations, a method is provided that includes receiving, via one or more network interfaces of an automated assistant computing system at a first time: a first IoT state change notification from a first third-party system. The first IoT state change notification is transmitted to the automated assistant computing system and indicates a change to a first state associated with a first group of one or more IoT devices. The first IoT state change notification includes a unique identifier, an indication of the first group of one or more IoT devices, and a first state indication that indicates the first state associated with the first group of one or more IoT devices. The method further includes identifying, by the automated assistant computing system based on the unique identifier, a client device that is associated with the unique identifier and that includes an automated assistant client. The method further includes determining to transmit a first command that causes the automated assistant client of the candidate assistant client device to automatically and immediately audibly render first output that is tailored to the first IoT state change notification. Determining to transmit the first command that causes the automated assistant client of the candidate assistant client device to automatically and immediately audibly render the first output that is tailored to the first IoT state change notification is based on the indication of the first group of one or more IoT devices and/or the first state indication that indicates the first state associated with the first group of one or more IoT devices. The method further includes receiving, via one or more network interfaces of an automated assistant computing system at a second time: a second IoT state change notification from a second third-party system. The second IoT state change notification is transmitted to the automated assistant computing system and indicates a change to a second state associated with a second group of one or more IoT devices. The second IoT state change notification includes the unique identifier or an additional unique identifier, an indication of the second group of one or more IoT devices, and a second state indication that indicates the second state associated with the second group of one or more IoT devices. The method further includes identifying, by the automated assistant computing system based on the unique identifier or the additional unique identifier, the client device that includes the automated assistant client. The method further includes determining to transmit a second command that causes the automated assistant client of the assistant client device to render second output that is tailored to the second IoT state change notification, but to render the second output non-audibly and/or non-immediately. Determining to transmit the second command that causes the automated assistant client of the candidate assistant client device to render the second output non-audibly and/or non-immediately is based at least in part on: the indication of the second group of one or more IoT devices and/or the second state indication that indicates the second state associated with the second group of one or more IoT devices.

What is claimed is:

1. A method comprising:
  receiving, via one or more network interfaces of an automated assistant computing system, an IoT state change notification, the IoT state change notification transmitted to the automated assistant computing system in response to determining a change in a state associated with at least one IoT device and comprising:
    a unique identifier,
    an indication of the at least one IoT device, and
    a state indication that indicates the change in the state associated with the at least one IoT device;
  identifying, by the automated assistant computing system based on the unique identifier, a plurality of assistant client devices that are each associated with the unique identifier and that each have a corresponding automated assistant client;
  selecting a subset of the assistant client devices, wherein selecting the subset is based at least in part on one or both of: the indication of the at least one IoT device, and the state indication that indicates the change in the state associated with the at least one IoT device;
  transmitting, to only each of the assistant client devices of the selected subset, a corresponding command that causes the automated assistant client of the assistant client device to:
    automatically render a corresponding notification that is tailored to the IoT state change notification.

2. The method of claim 1, wherein the at least one IoT device is a smart doorbell.

3. The method of claim 1, further comprising:
  receiving, via one or more of the network interfaces of the automated assistant computing system, an additional IoT state change notification, the additional IoT state change notification transmitted to the automated assistant computing system in response to determining an additional change in an additional state associated with an additional IoT device that is disparate from the at least one IoT device, the additional IoT state change notification comprising:
    an additional unique identifier,
    an additional indication of the additional IoT device, and
    an additional state indication that indicates the additional change in the additional state associated with the additional IoT device;
  selecting, from the plurality of assistant client devices, an additional subset of the assistant client devices, the additional subset being different from the subset, wherein selecting the additional subset is based at least in part on one or both of: the additional indication of the additional IoT device, and the additional state indication that indicates the additional change in the additional state associated with the additional IoT device;
  transmitting, to only each of the assistant client devices of the additional selected subset, a corresponding additional command that causes the automated assistant client of the assistant client device to:
    automatically render a corresponding additional notification that is tailored to the additional IoT state change notification.

4. The method of claim 3, wherein the at least one IoT device is a first smart doorbell and the additional IoT device is a second smart doorbell.

5. The method of claim 3, wherein the at least one IoT device is a first smart appliance and the additional IoT device is a second smart appliance.

6. The method of claim 1, wherein selecting the subset is based at least in part on both of: the indication of the at least one IoT device, and the state indication that indicates the change in the state associated with the at least one IoT device.

7. The method of claim 1, wherein selecting the subset is further based at least in part on current properties of the plurality of assistant client devices.

8. The method of claim 1, wherein selecting the subset is further based at least in part on a time of day or a day of the week.

9. The method of claim 1, wherein the assistant client devices of the selected subset comprises a first assistant client device and a second assistant client device, and wherein the corresponding notification that is automatically rendered by the automated assistant client of the first assistant client device is less obtrusive than the corresponding notification that is automatically rendered by the automated assistant client of the second assistant client device.

10. The method of claim 9, further comprising:
determining, based on a current state of the first assistant client device, to automatically render, at the first assistant client device, the corresponding notification that is less obtrusive than the corresponding notification that is automatically rendered by the automated assistant client of the second assistant client device.

11. The method of claim 1, wherein the assistant client devices of the selected subset comprises a first assistant client device and a second assistant client device, and wherein the corresponding notification that is automatically rendered by the automated assistant client of the first assistant client device is an audible only notification and wherein the corresponding notification that is automatically rendered by the automated assistant client of the second assistant client device is audible and visual.

12. The method of claim 1, wherein the at least one IoT device is a smart appliance and the change in the state indicates an error condition of the smart appliance.

13. A method comprising:
receiving, via one or more network interfaces of an automated assistant computing system at a first time:
a first IoT state change notification from a first third-party system, the first IoT state change notification transmitted to the automated assistant computing system indicating a change to a first state associated with a first group of one or more IoT devices and comprising: a unique identifier, an indication of the first group of one or more IoT devices, and a first state indication that indicates the first state associated with the first group of one or more IoT devices;
identifying, by the automated assistant computing system based on the unique identifier, a plurality of candidate assistant client devices that are each associated with the unique identifier and that each have a corresponding automated assistant client;
selecting a first subset of the candidate assistant client devices, wherein selecting the first subset is based at least in part on one or both of: the indication of the first group of one or more IoT devices, and the first state indication that indicates the first state associated with the first group of one or more IoT devices;
transmitting, to only each of the candidate assistant client devices of the first subset, a corresponding command that causes the automated assistant client of the candidate assistant client device to:
automatically render a corresponding notification that is tailored to the first IoT state change notification;
receiving, via one or more network interfaces of the automated assistant computing system at a second time:
a second IoT state change notification from a second third-party system, the second IoT state change notification transmitted to the automated assistant computing system indicating a change to a second state associated with a second group of one or more IoT devices and comprising: the unique identifier or an additional unique identifier, an indication of the second group of one or more IoT devices, and a second state indication that indicates the second state associated with the second group of one or more IoT devices;
identifying, by the automated assistant computing system based on the unique identifier or the additional unique identifier, the plurality of candidate assistant client devices;
selecting a second subset of the candidate assistant client devices, wherein the second subset varies from the first subset and wherein selecting the second subset is based at least in part on one or both of: the indication of the second group of one or more IoT devices, and the second state indication that indicates the second state associated with the second group of one or more IoT devices;
transmitting, to only each of the candidate assistant client devices of the second subset, a corresponding second command that causes the automated assistant client of the candidate assistant client device to:
automatically render a corresponding second notification that is tailored to the second IoT state change notification.

* * * * *